Figure 1:
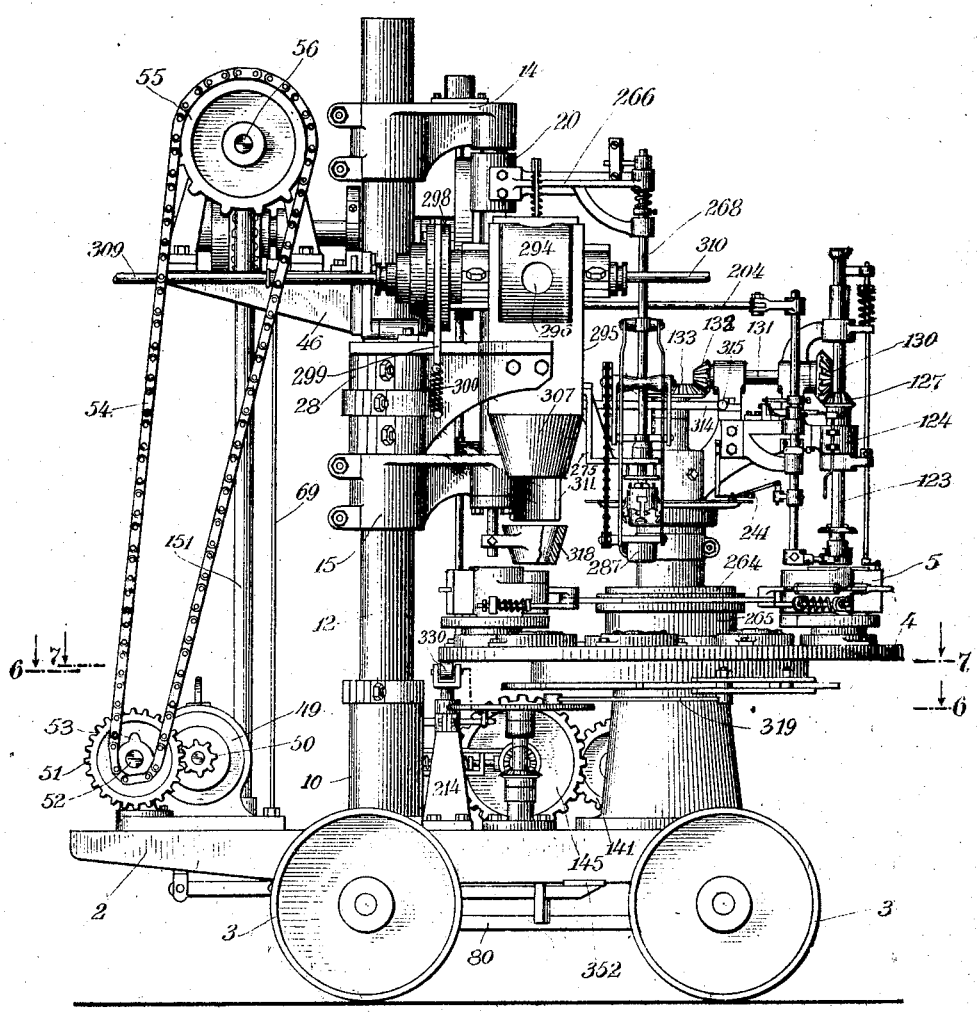

S. OLSEN.
PRESS FOR MOLDING INSULATORS OR SIMILAR ARTICLES.
APPLICATION FILED DEC. 3, 1909.

1,049,594.

Patented Jan. 7, 1913.
21 SHEETS—SHEET 3.

Witnesses:
John O Gumpler
Ged m Harris

Inventor,
Sigward Olsen,
By his Attorneys
Kenyon & Kenyon

S. OLSEN.
PRESS FOR MOLDING INSULATORS OR SIMILAR ARTICLES.
APPLICATION FILED DEC. 3, 1909.

1,049,594.

Patented Jan. 7, 1913.
21 SHEETS—SHEET 6.

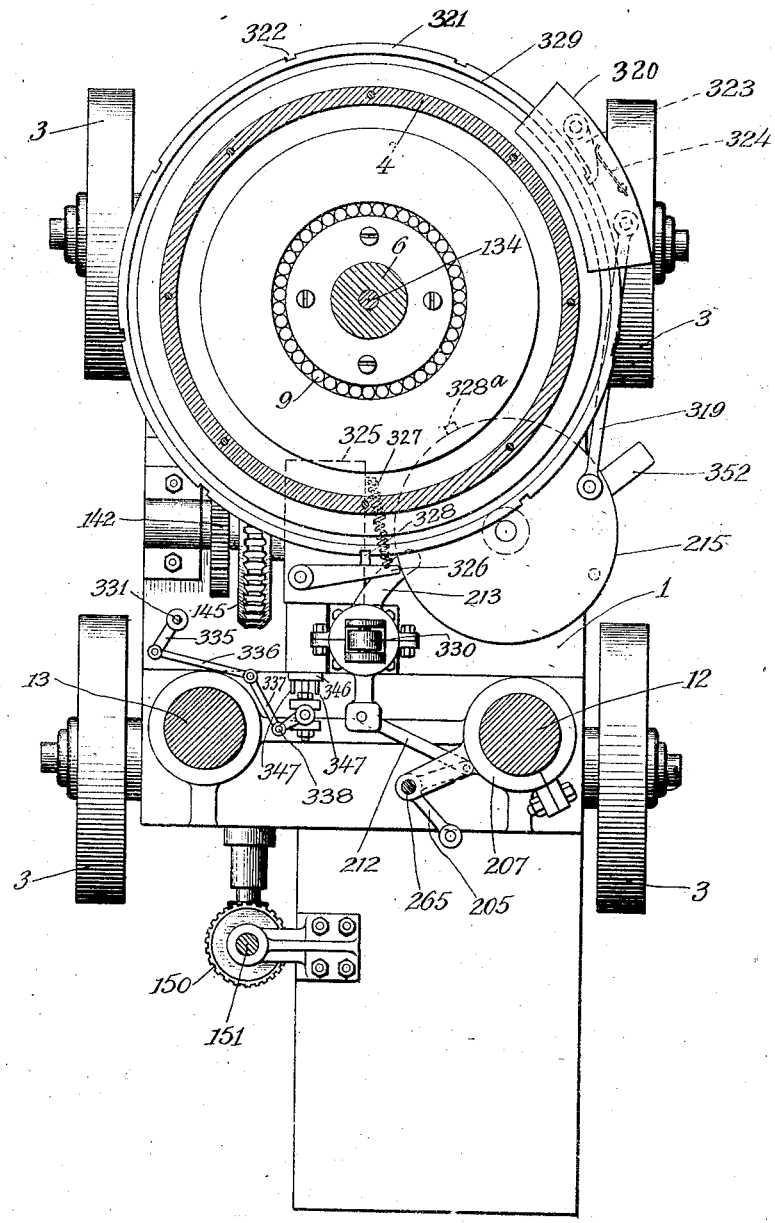

S. OLSEN.
PRESS FOR MOLDING INSULATORS OR SIMILAR ARTICLES.
APPLICATION FILED DEC. 3, 1909.
1,049,594.
Patented Jan. 7, 1913.
21 SHEETS—SHEET 8.
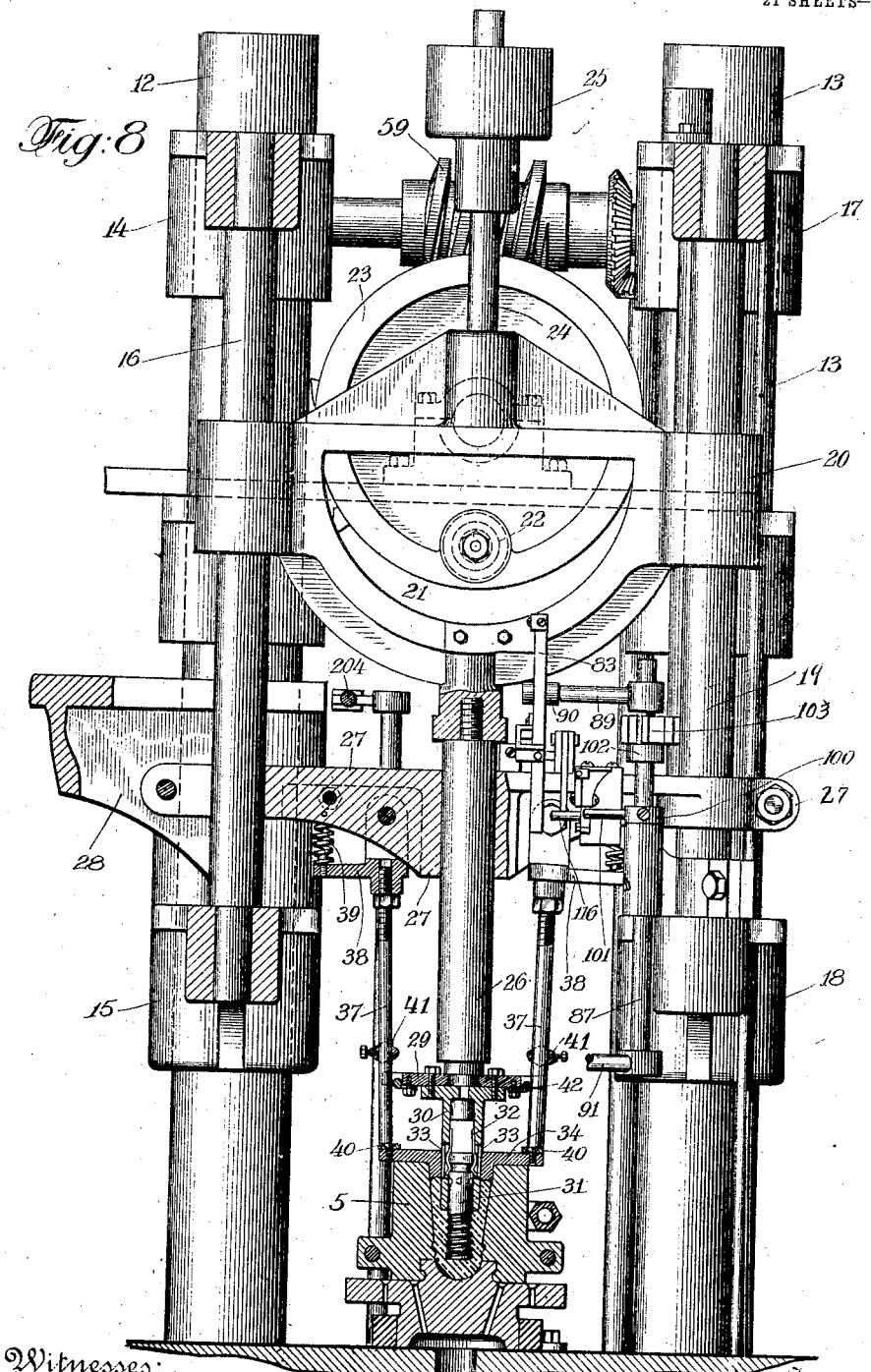

S. OLSEN.
PRESS FOR MOLDING INSULATORS OR SIMILAR ARTICLES.
APPLICATION FILED DEC. 3, 1909.
1,049,594.
Patented Jan. 7, 1913.
21 SHEETS—SHEET 9.
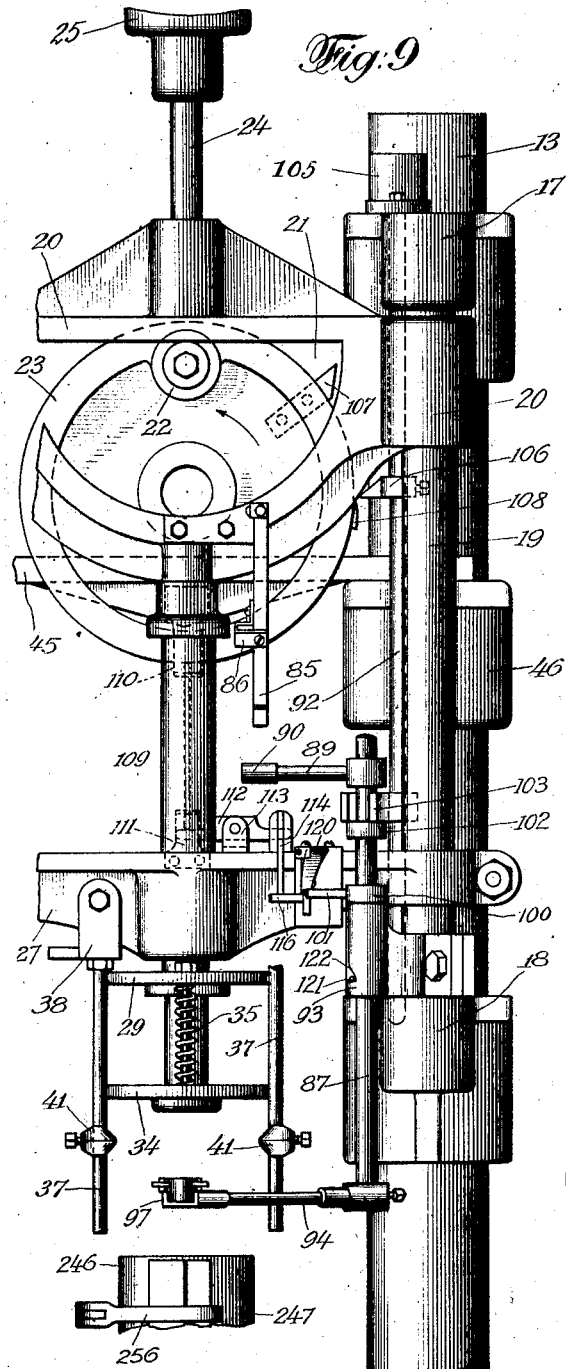
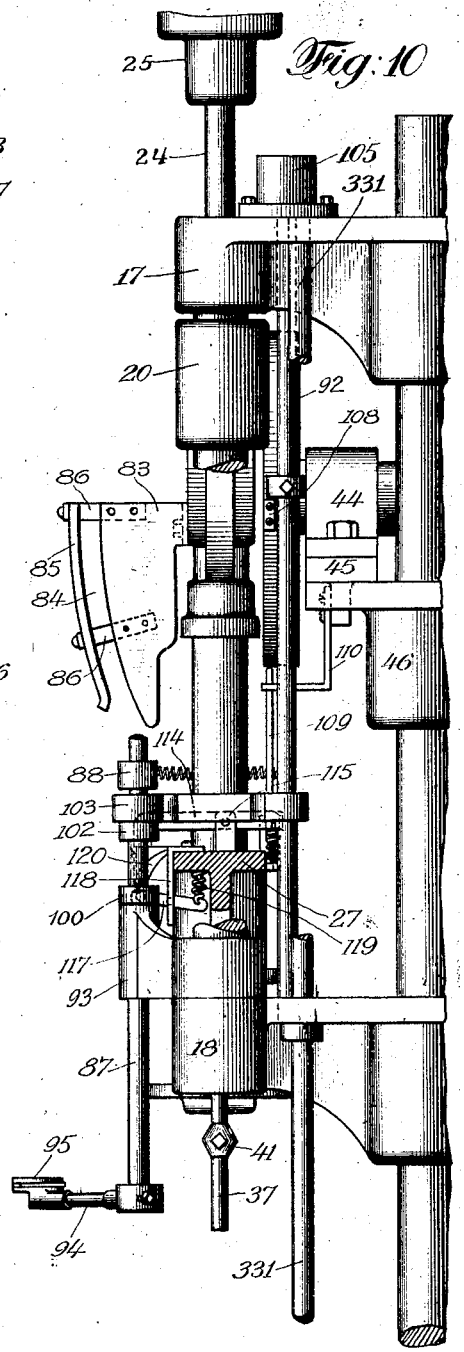

S. OLSEN.
PRESS FOR MOLDING INSULATORS OR SIMILAR ARTICLES.
APPLICATION FILED DEC. 3, 1909.
1,049,594.
Patented Jan. 7, 1913.
21 SHEETS—SHEET 10.
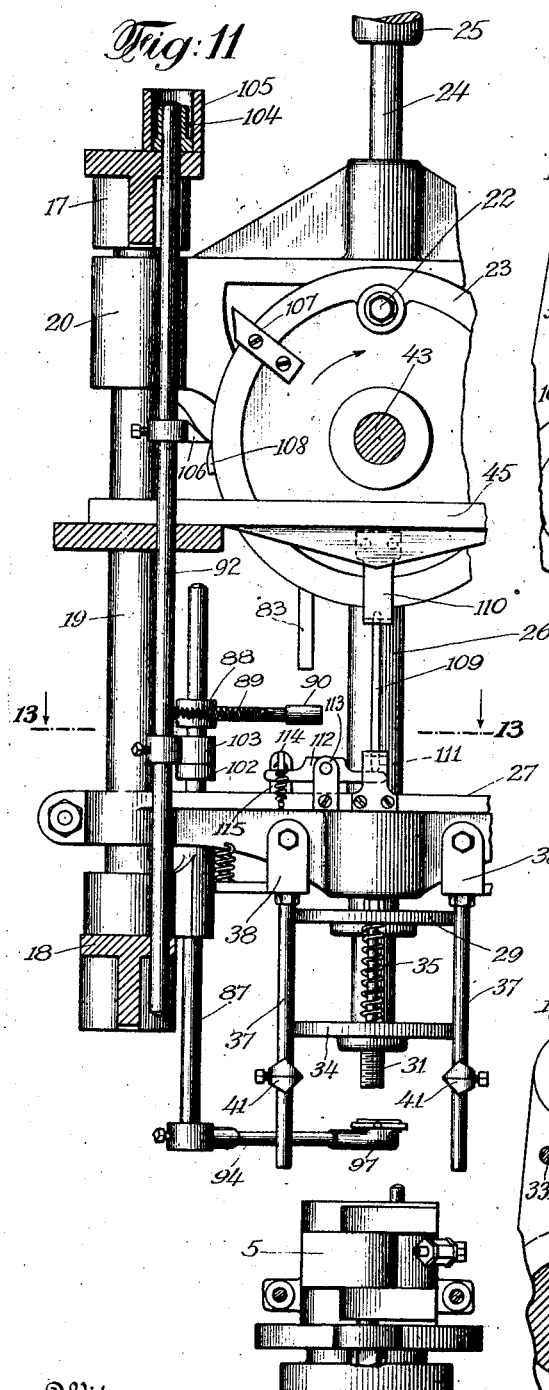
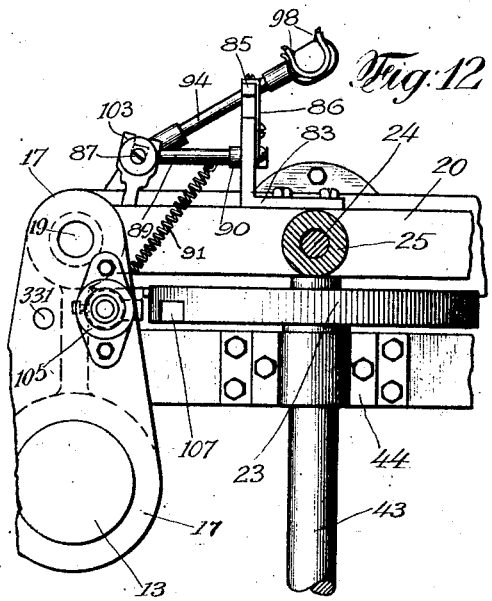
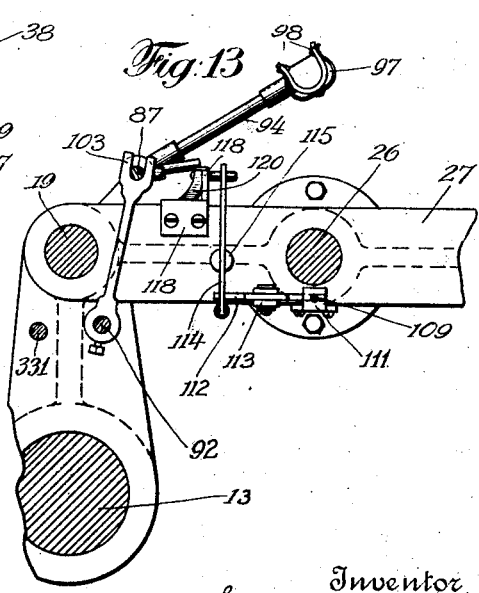
Witnesses:
John O. Gaudler
Geo. M. Harris
Inventor,
Sigward Olsen,
By his Attorneys
Kenyon & Kenyon S. OLSEN.
PRESS FOR MOLDING INSULATORS OR SIMILAR ARTICLES.
APPLICATION FILED DEC. 3, 1909.
1,049,594. Patented Jan. 7, 1913.
21 SHEETS—SHEET 11.
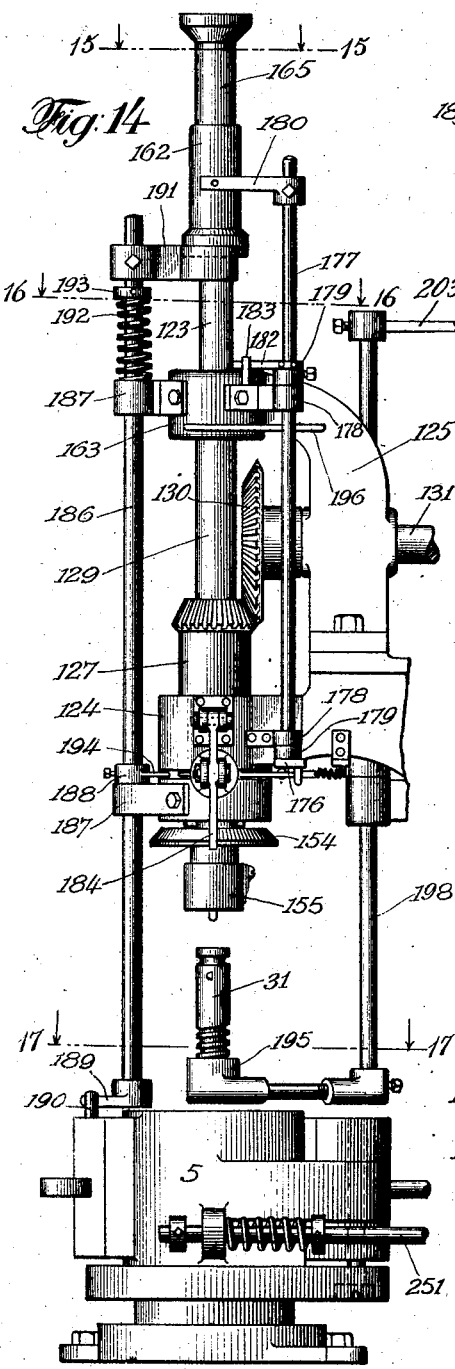
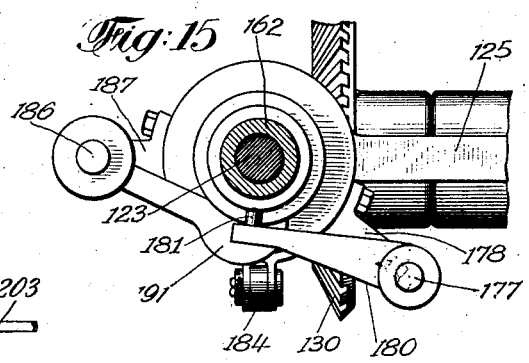
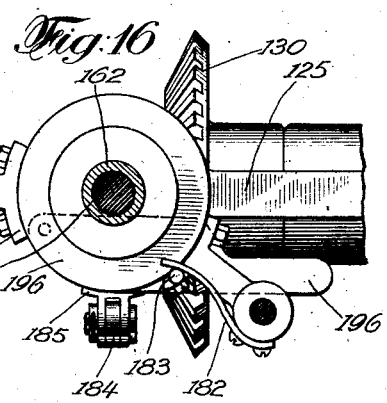
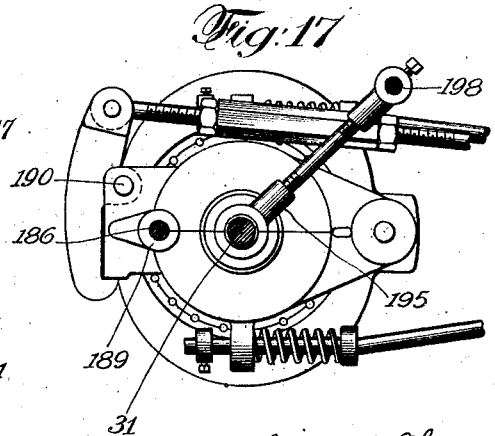
Witnesses:
John O. Gempler
Ged. M. Harris
Sigward Olsen, Inventor,
By his Attorneys
Kenyon & Kenyon

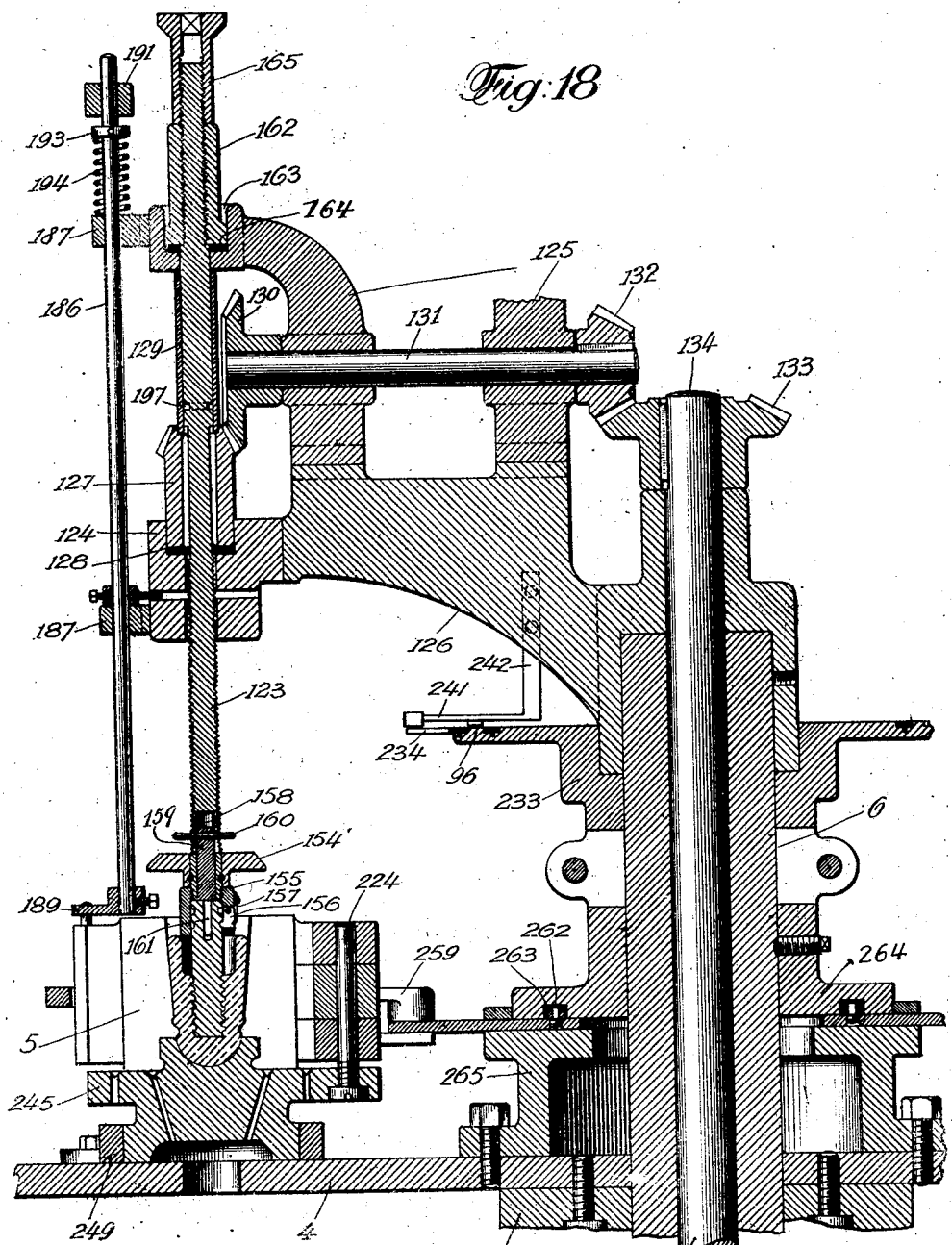

S. OLSEN.
PRESS FOR MOLDING INSULATORS OR SIMILAR ARTICLES.
APPLICATION FILED DEC. 3, 1909.
1,049,594.
Patented Jan. 7, 1913.
21 SHEETS—SHEET 13.
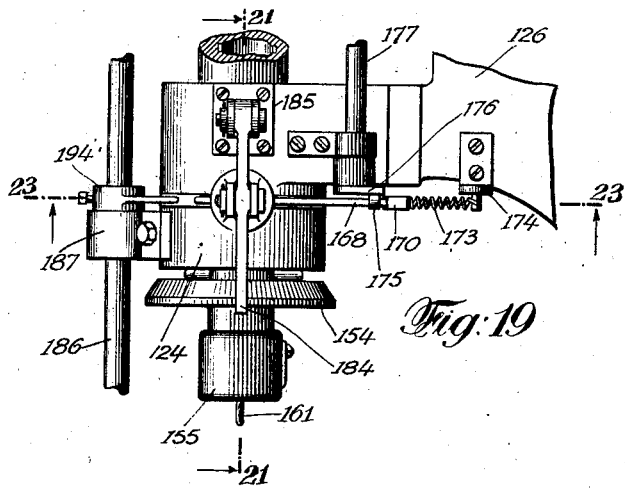
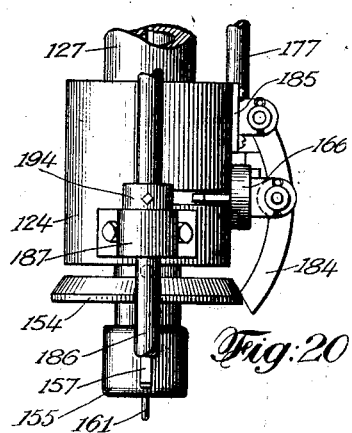
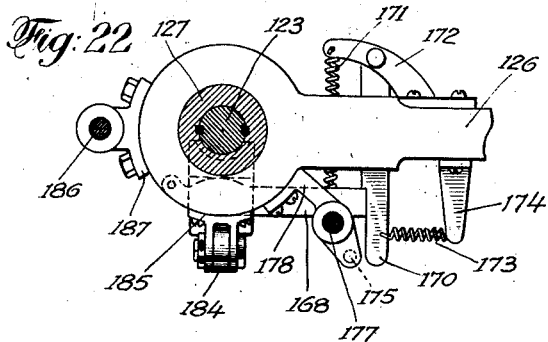
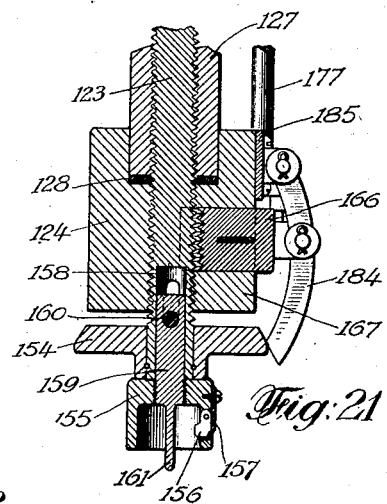
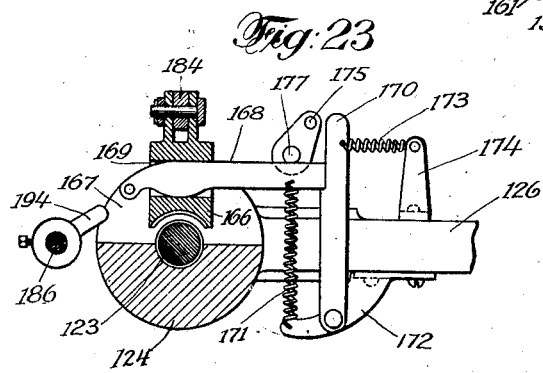

S. OLSEN.
PRESS FOR MOLDING INSULATORS OR SIMILAR ARTICLES.
APPLICATION FILED DEC. 3, 1909.

1,049,594.

Patented Jan. 7, 1913.
21 SHEETS—SHEET 14.

S. OLSEN.
PRESS FOR MOLDING INSULATORS OR SIMILAR ARTICLES.
APPLICATION FILED DEC. 3, 1909.

1,049,594.

Patented Jan. 7, 1913.
21 SHEETS—SHEET 15.

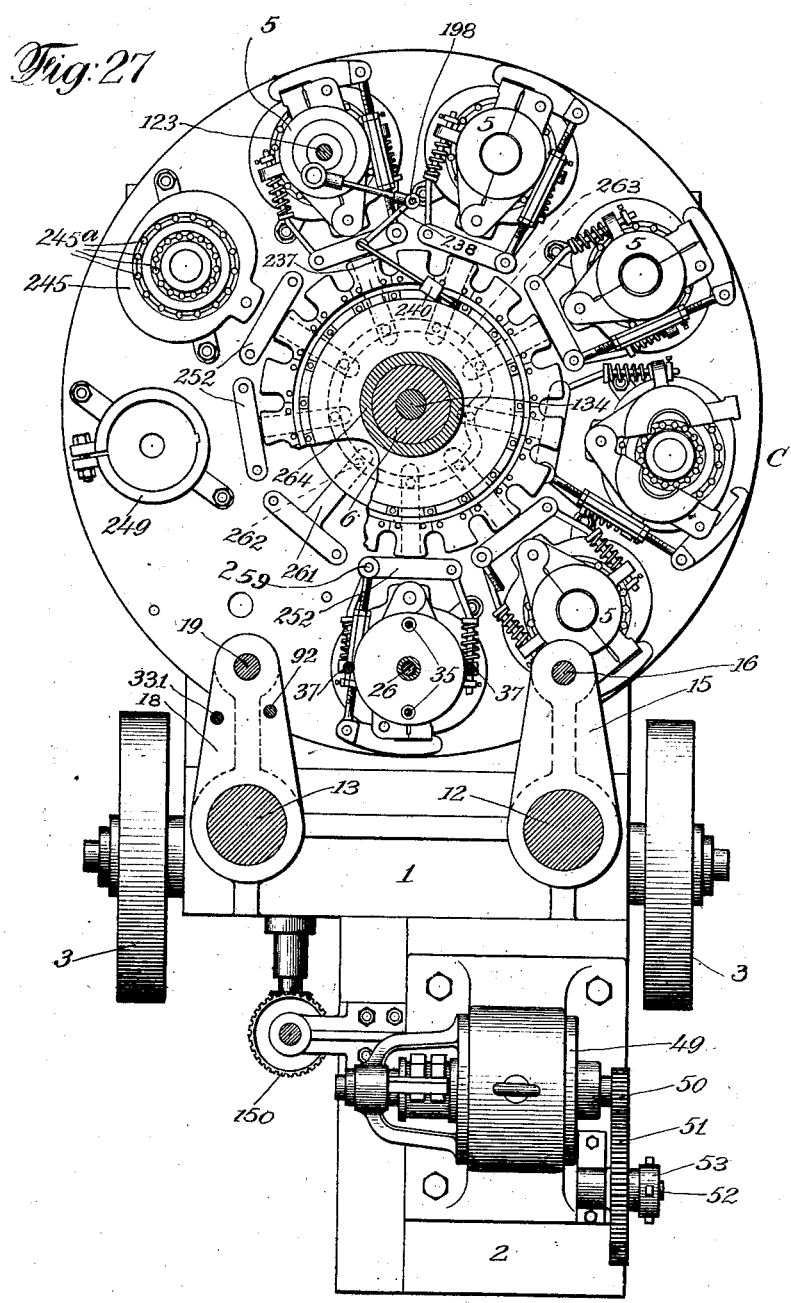

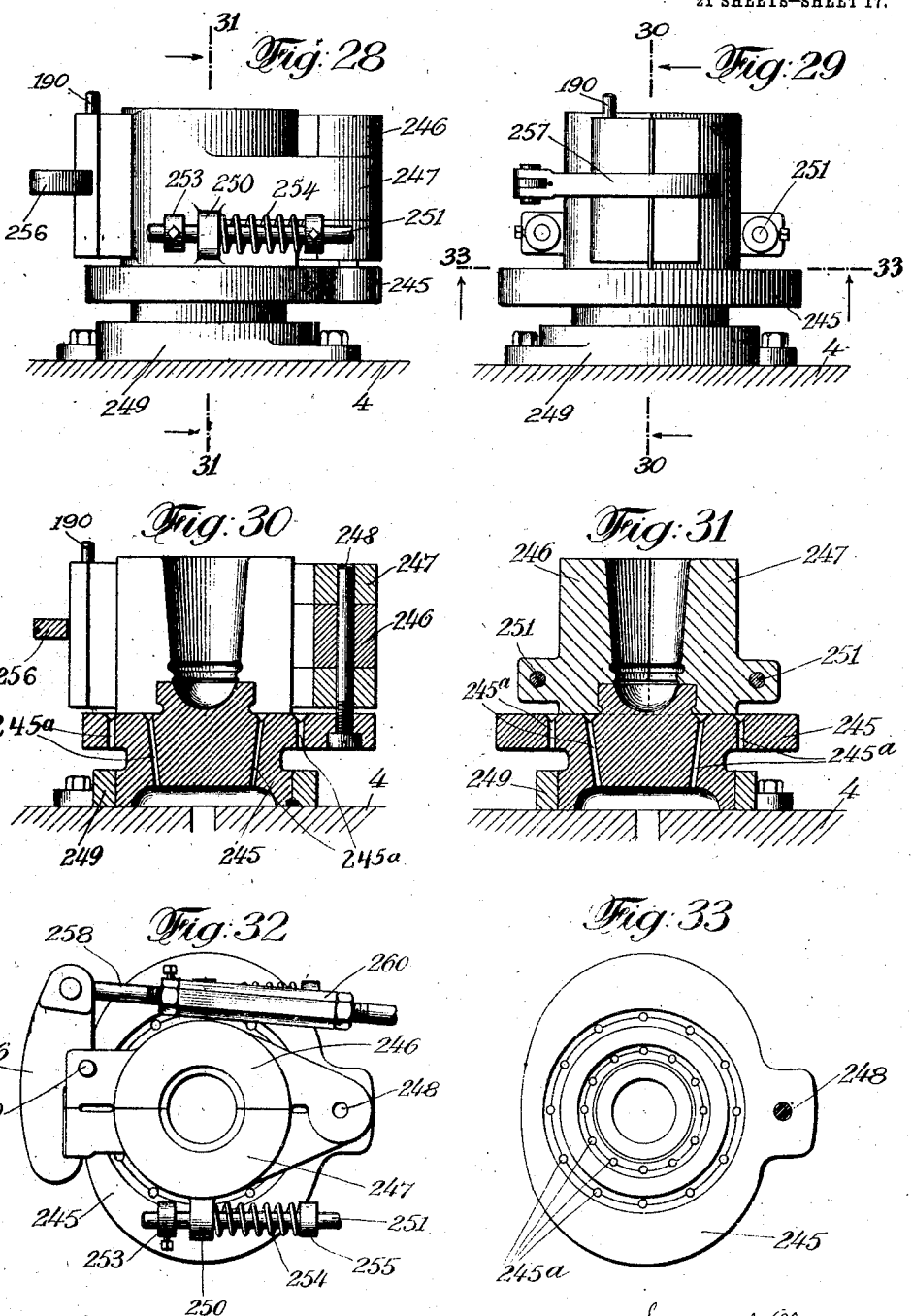

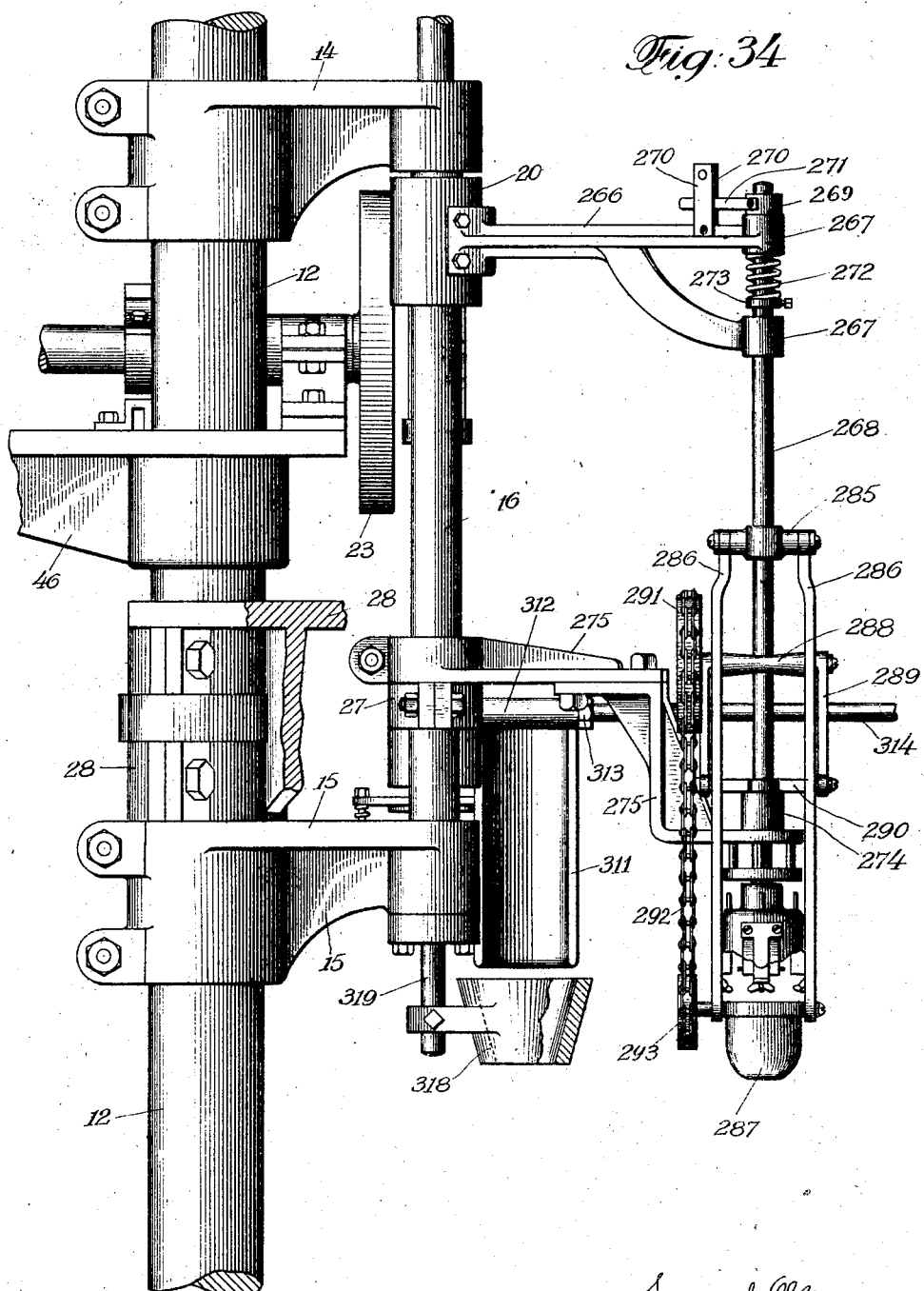

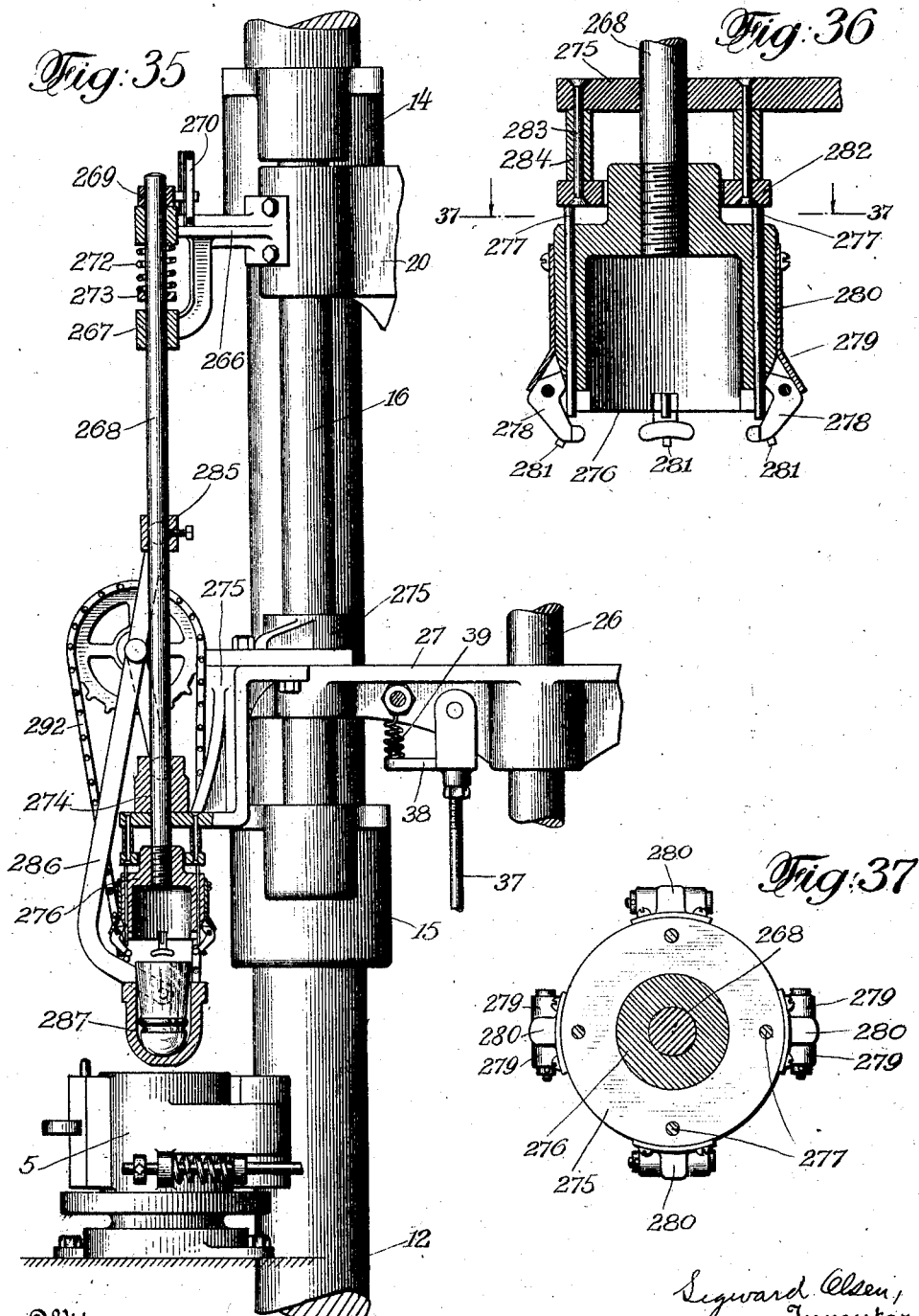

S. OLSEN.
PRESS FOR MOLDING INSULATORS OR SIMILAR ARTICLES.
APPLICATION FILED DEC. 3, 1909.
1,049,594.
Patented Jan. 7, 1913.
21 SHEETS—SHEET 20.
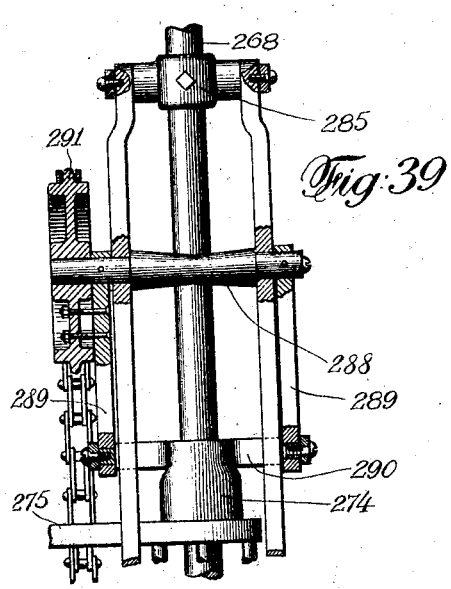
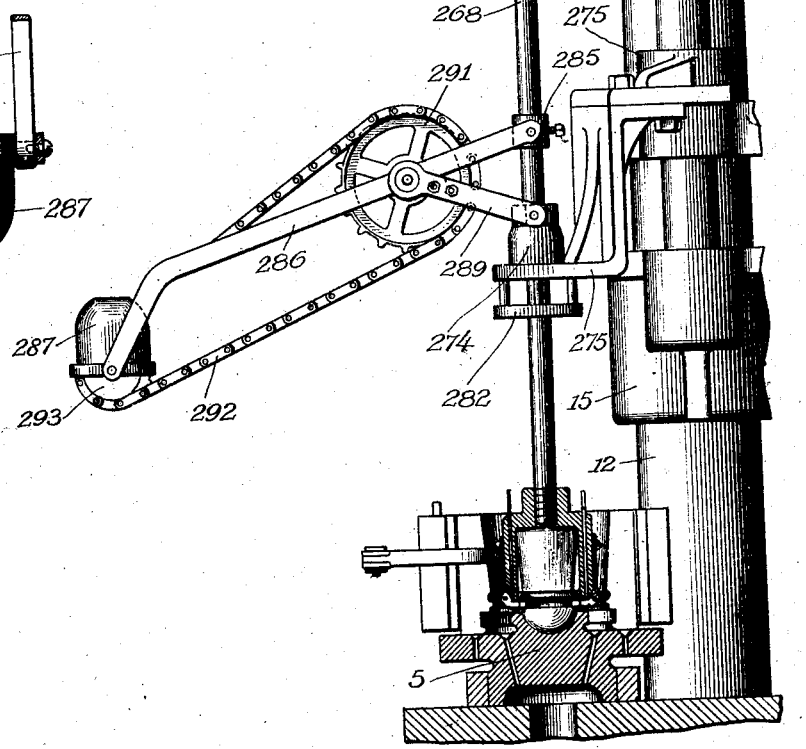

S. OLSEN.
PRESS FOR MOLDING INSULATORS OR SIMILAR ARTICLES.
APPLICATION FILED DEC. 3, 1909.
1,049,594.
Patented Jan. 7, 1913.
21 SHEETS—SHEET 21.
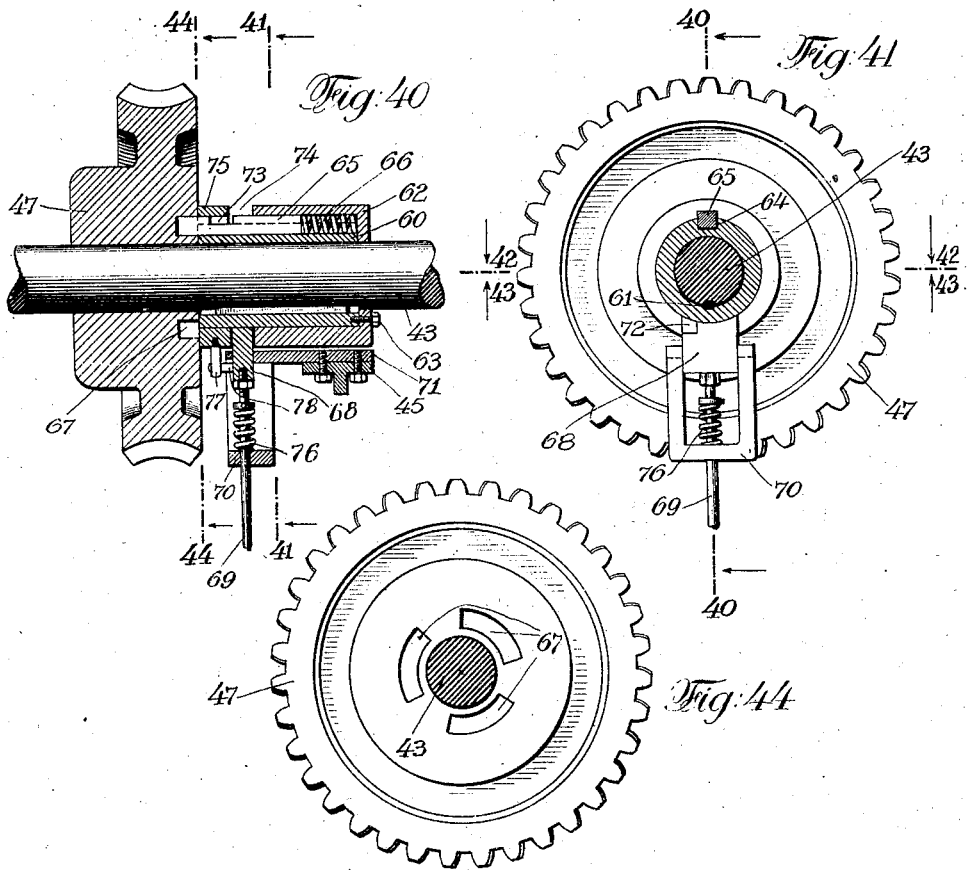
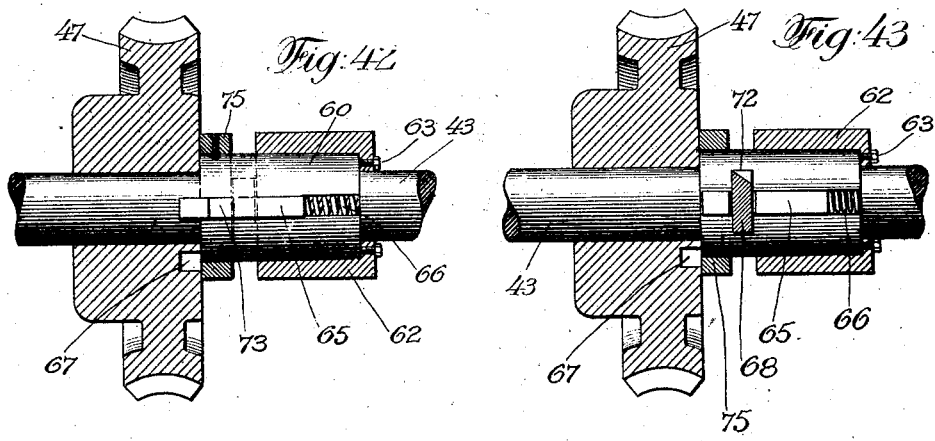
Witnesses:
John O. Gempler
Geo. M. Harris
Inventor,
Sigward Olsen,
By his Attorneys
Kenyon & Kenyon

UNITED STATES PATENT OFFICE.

SIGWARD OLSEN, OF BROOKLYN, NEW YORK, ASSIGNOR TO THE BROOKFIELD GLASS COMPANY, OF OLD BRIDGE, NEW JERSEY, A CORPORATION OF NEW JERSEY.

PRESS FOR MOLDING INSULATORS OR SIMILAR ARTICLES.

1,049,594.  Specification of Letters Patent.  Patented Jan. 7, 1913.

Application filed December 3, 1909. Serial No. 531,237.

*To all whom it may concern:*

Be it known that I, SIGWARD OLSEN, a citizen of the United States, and a resident of Brooklyn, in the county of Kings and State of New York, have invented certain new and useful Improvements in Presses for Molding Insulators or Similar Articles, of which the following is a specification.

My invention relates to presses for molding insulators or similar articles, and it is particularly adapted for the manufacture of what are known as screw insulators, although it may be employed for making other articles.

The objects of my invention are to provide a machine which will automatically perform the various operations which are necessary in the molding of such articles, so that one part of the machine may be connected by any suitable means with the glass furnace and, the glass being supplied from such source, the machine will operate continuously and automatically to manufacture the insulators or other articles, and deliver them, at another point of the machine, to a suitable carrier or other device, ready for transfer to the leer or annealing oven.

Another object of the invention is to so construct the machine that it will work rapidly and accurately and in such a manner as to successfully meet the peculiar conditions which arise in connection with the manufacture of articles out of molten glass.

Another object of the invention is to enable the parts of the machine to be readily adjusted so as to work in harmony, one with another, and so as to be fitted to produce various sizes and kinds of insulators or other articles.

A further object is to provide a machine which will have the largest output within a given time, and will require the minimum of attention and labor on the part of the operatives in connection therewith.

My invention consists first in the combination in such a press of a suitable number of molds, and a table or movable support for carrying the same from one position to another, feeding mechanism for feeding glass to the mold, plunger inserting mechanism for inserting the plunger in the glass, mechanism for transferring the plunger from the rack to and inserting it in the actuating rod, mechanism for withdrawing the plunger from the mold at the proper time, mechanism for carrying the plunger from the withdrawing mechanism to the plunger rack, mechanism for opening and closing the mold, and mechanism for removing the insulator from the mold, and depositing it on a suitable carrier or other device for conveying it to the leer.

My invention also consists in the general and particular construction of each of these separate mechanisms.

My invention also consists in other features of construction and combinations of parts which are hereinafter described and particularly set forth in the claims.

My invention is illustrated in the accompanying drawings in which—

Figure 2:
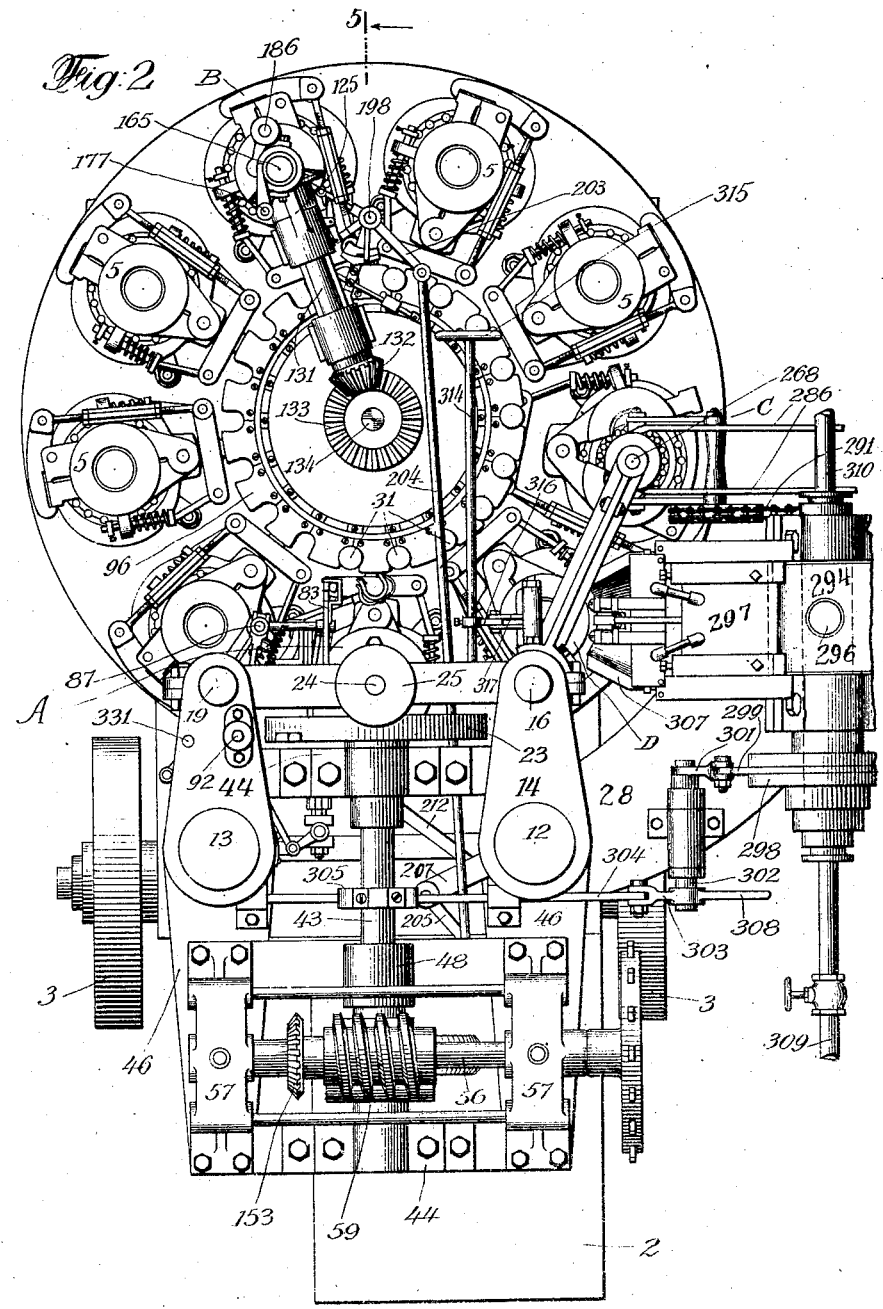
Figure 3:
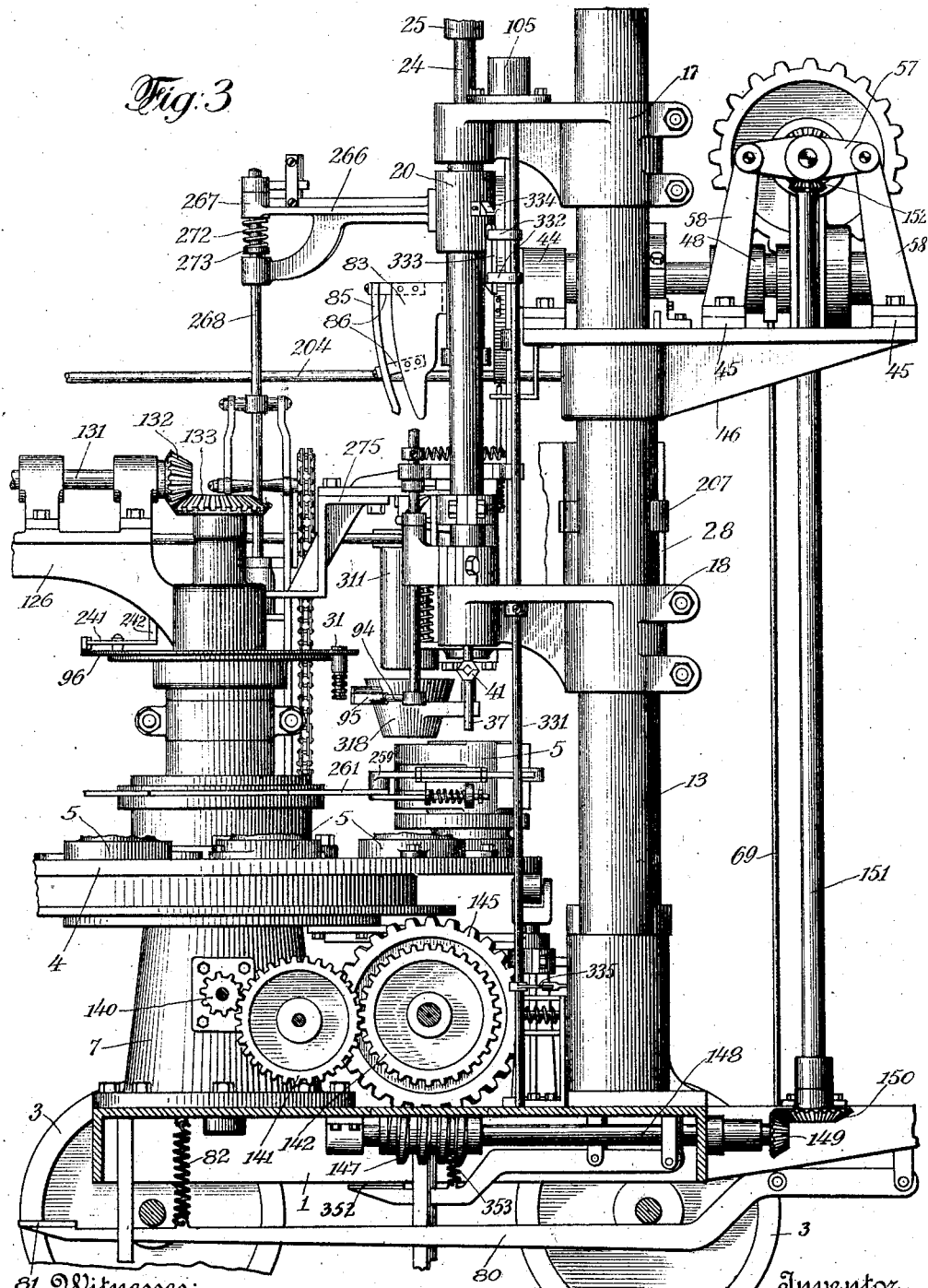
Figure 4:
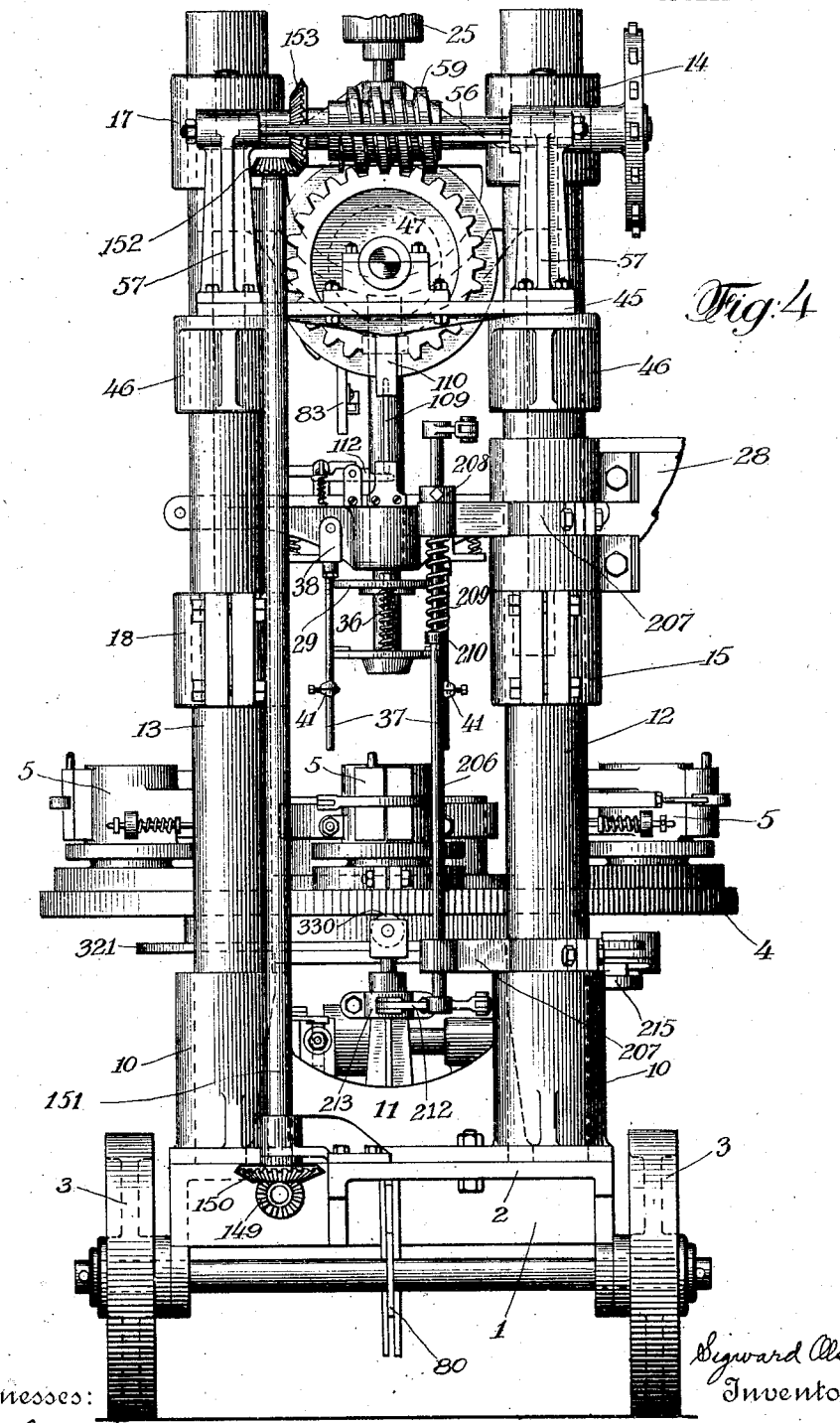
Figure 5:
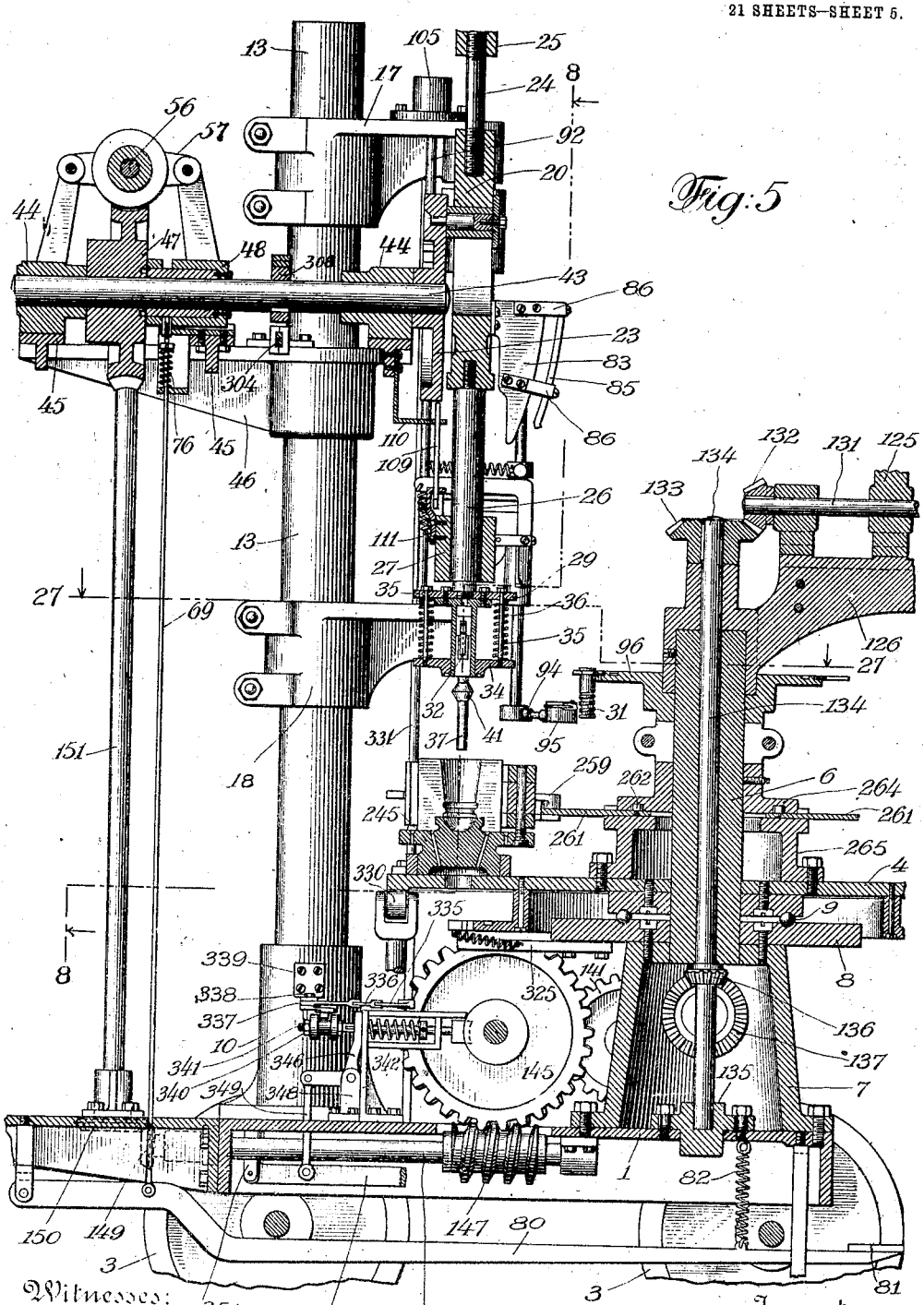
Figure 6:
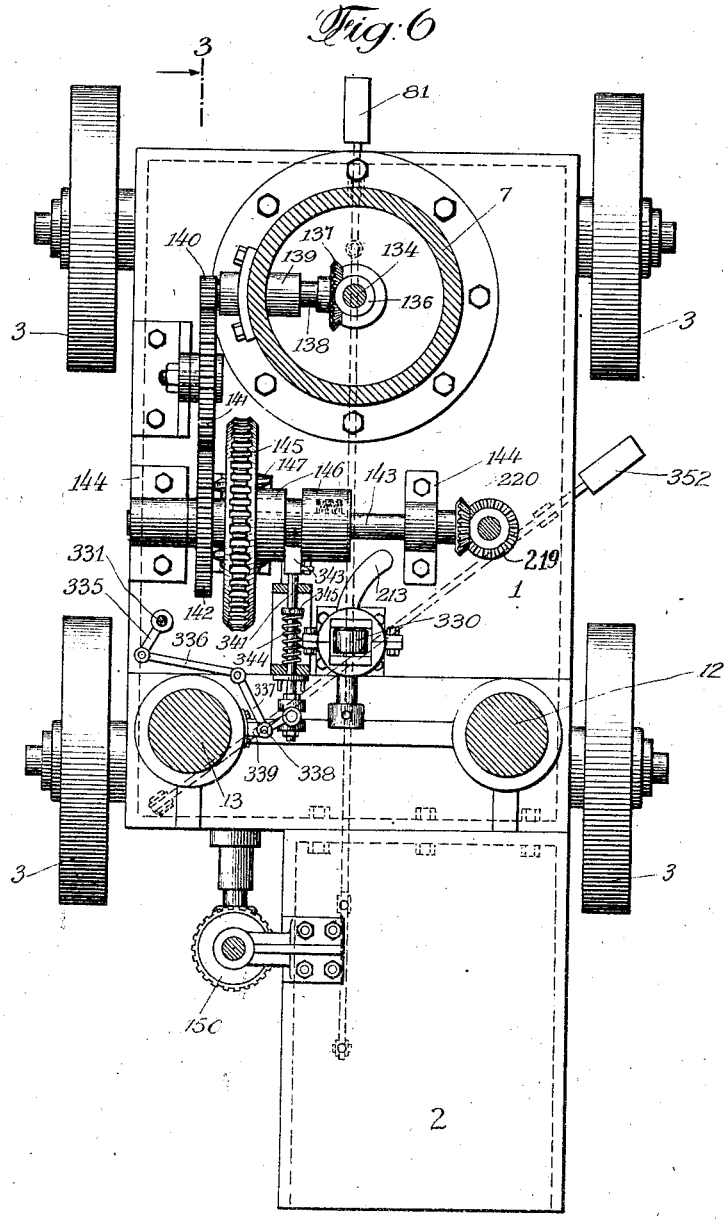
Figure 24:
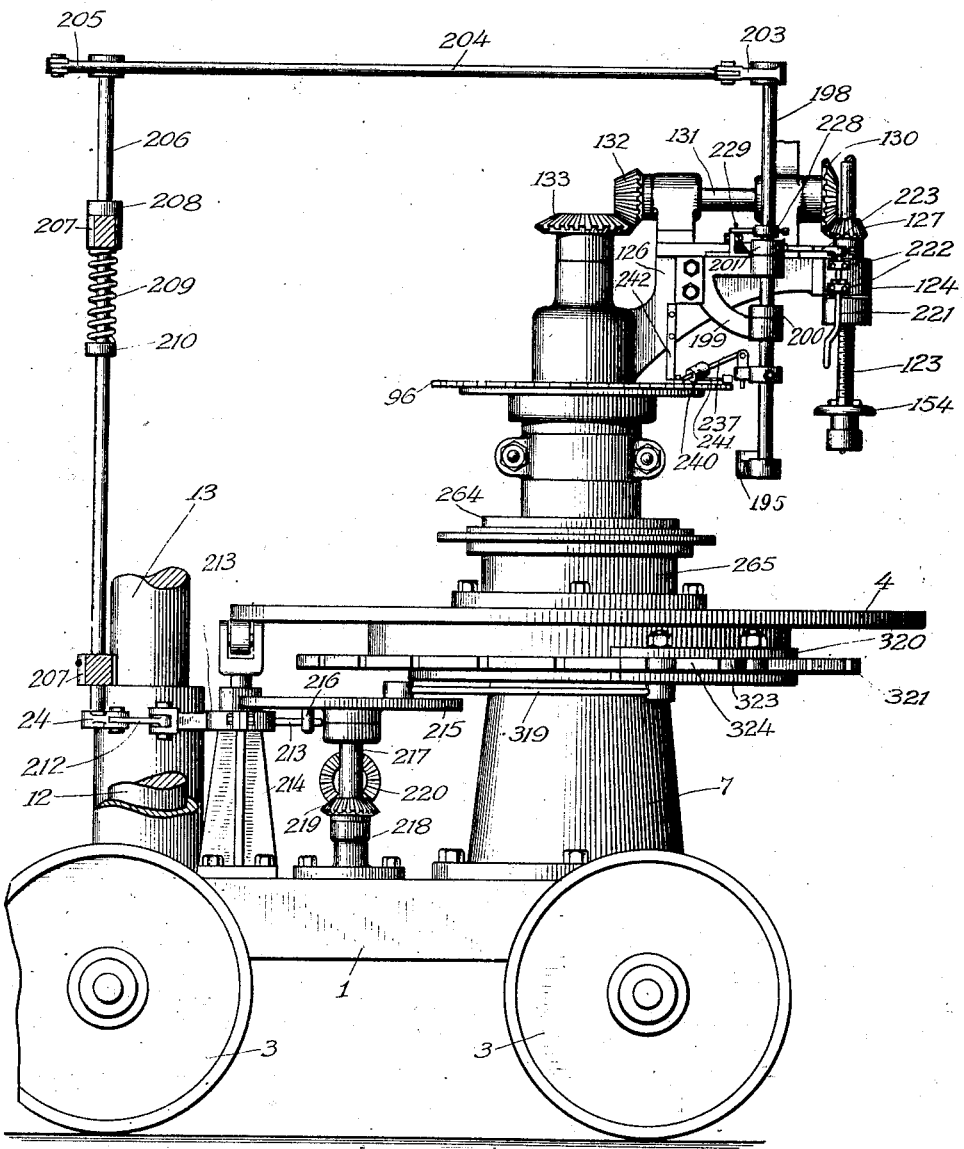
Figure 25:
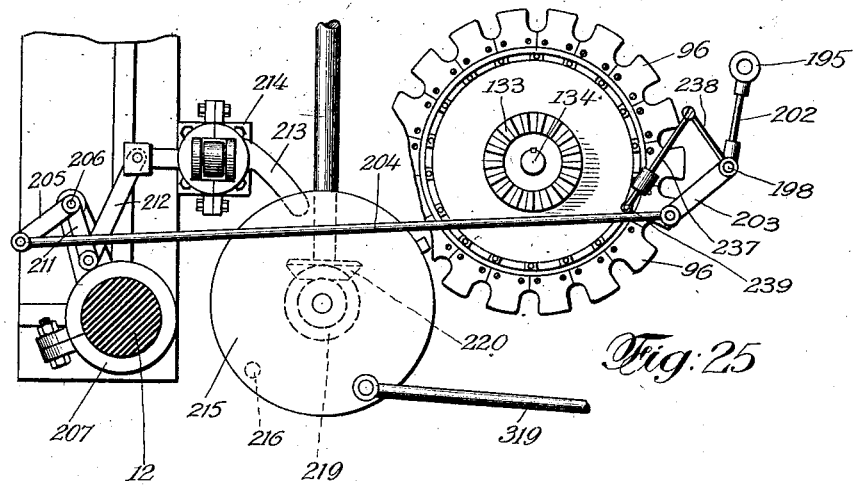
Figure 26:
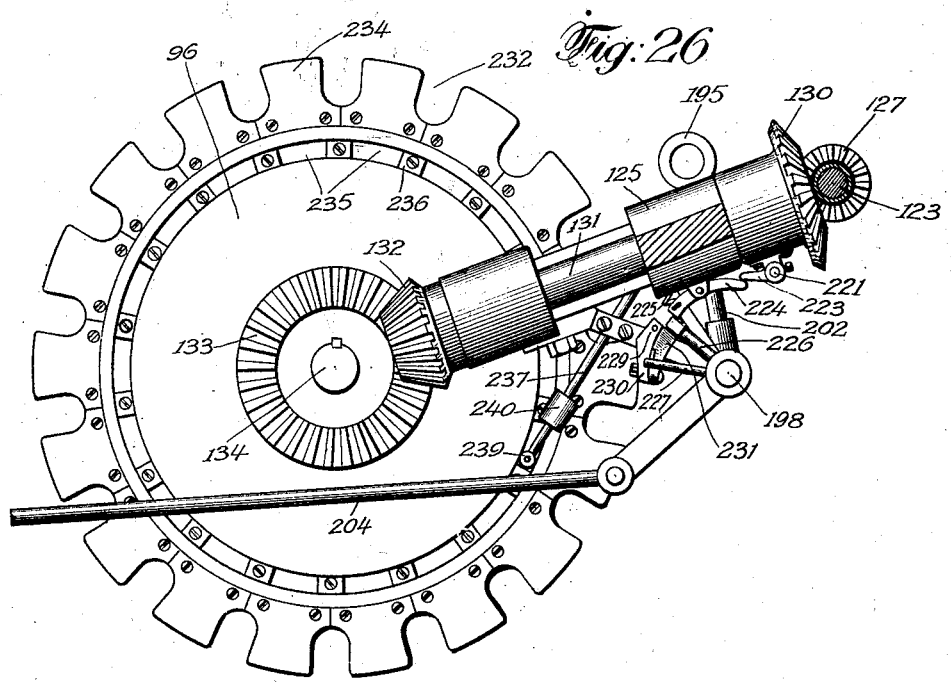

Figure 1 is a side view of the complete machine; Fig. 2 is a plan view of the same; Fig. 3 is a vertical longitudinal section taken on the line 3—3 of Fig. 6, looking in the direction of the arrows; Fig. 4 is an end view of the complete machine; Fig. 5 is a longitudinal vertical section taken on the line 5—5 of Fig. 2, looking in the direction of the arrows, with a portion of the machine broken away; Fig. 6 is a horizontal plan section taken on the line 6—6 of Fig. 1, showing clutch mechanism and gear connections for mold table and screw extracting mechanism; Fig. 7 is a horizontal plan section taken on the line 7—7 of Fig. 1, showing means for operating the mold table; Fig. 8 is a vertical cross-section taken on the line 8—8 of Fig. 5 looking in the direction of the arrows and showing a screw-plunger inserted in the mold, together with the follower and operating mechanism connected therewith; Fig. 9 is an enlarged view showing details of the mechanism for transferring the screw-plunger from the rack to the inserting device; Fig. 10 is an enlarged side view of the same mechanism; Fig. 11 is an enlarged rear view of the same mechanism; Fig. 12 is a detail plan view of the same mechanism; Fig. 13 is an enlarged detail plan section of the same mechanism taken on the line 13—13 of Fig. 11; Fig. 14 is a detail front view of the screw extracting mechanism, showing a mold in position, underneath the same; Fig. 15 is a detail plan section of the screw extracting mechanism, taken on the line 15—15 of Fig. 14, looking downwardly; Fig. 16 is a section of the same mechanism, taken on the line 16—16 of Fig. 14 looking downwardly; Fig. 17 is a section of the same mechanism taken on the line 17—17 of Fig. 14, looking downwardly; Fig. 18 is a vertical section of a portion of the mold table and of the screw plunger unscrewing mechanism, showing that mechanism in its lowest position after it has engaged the screw plunger; Fig. 19 is an enlarged detail front view of the mechanism for operating the half nut during the extraction of the screw plunger; Fig. 20 is a detail side view of the same mechanism; Fig. 21 is a vertical cross-section of the same mechanism taken on the line 21—21 of Fig. 19, looking in the direction of the arrows; Fig. 22 is a detail plan view of the same mechanism; Fig. 23 is a detail horizontal section on the line 23—23 of Fig. 19 looking in the direction of the arrows; Fig. 24 is a side elevation of the machine showing the means for supporting and operating the mold table, and also the mechanism for transferring the screw plunger from the unscrewing mechanism to the rack, certain parts being omitted for clearness; Fig. 25 is a plan view of a part of the mechanism shown in Fig. 24; Fig. 26 is an enlarged detail plan of the screw plunger rack and transferring mechanism; Fig. 27 is a horizontal section of the machine taken on the line 27—27 of Fig. 5 looking downwardly, showing the mold table with its molds and the mechanism for opening, closing and locking the same; Fig. 28 is a side view of the mold; Fig. 29 is a front view of the same; Fig. 30 is a vertical section through the mold taken on the line 30—30 of Fig. 29, looking in the direction of the arrows; Fig. 31 is a vertical section through the mold taken on the line 31—31 of Fig. 28 looking in the direction of the arrows; Fig. 32 is a top view of the mold in its closed and locked position; Fig. 33 is a plan view of the bottom plate of the mold; Fig. 34 is a front view of the mechanism for lifting the insulator out of the mold and placing it on the carrier to convey it to the annealing furnace, together with the connecting and operating means; Fig. 35 is a side view, partly in section, of the mechanism shown in Fig. 34; Fig. 36 is an enlarged detail section of the gripping mechanism for lifting the insulator from the mold; Fig. 37 is a top view of Fig. 36; Fig. 38 is a side view, partly in section, of the mechanism shown in Fig. 34, showing the position of the parts at the time of depositing the glass insulator on the carrier; Fig. 39 is an enlarged detail front view of the same mechanism partly in section and broken away at the middle; Fig. 40 is an enlarged vertical cross-section on the line 40—40 of Fig. 41, showing the main driving clutch mechanism; Fig. 41 is a vertical longitudinal section on the line 41—41 of Fig. 40 looking in the direction of the arrows; Fig. 42 is a horizontal section taken on the line 42—42 of Fig. 41, looking from above; Fig. 43 is a horizontal section taken on the line 43—43 of Fig. 41, looking from below; and Fig. 44 is a detail of the worm wheel shown in Fig. 41.

Referring to the drawings, and particularly to Figs. 1 to 8 inclusive and Fig. 27, 1 is a base or frame work upon which the different parts of the machine are carried. This frame has a forward end or extension 2. 3, 3 are wheels upon which the base is mounted so that the machine may be readily moved from place to place. 4 is a revolving table for carrying the molds 5. In the particular form illustrated the table is provided with nine molds arranged around the table consecutively and at equal distances apart, see Fig. 2. The table 4 revolves around the central post 6, which is supported from the hollow support 7, which is suitably fastened or bolted to the base 1, see Fig. 5. The support 7 carries at its upper end the plate 8 and the table 4 turns upon the ball bearings 9 which are placed between the plate 8 and the table 4, as shown in Fig. 5. 10 is a casting or frame-piece bolted, or otherwise fastened to the base 1, and formed of two hollow posts at each end connected by a middle web or wall 11. 12 and 13 are standards mounted in the hollow posts of the frame work 10, as shown. The standards 12 and 13 are in this way supported from the base and are designed to support most of the operating parts of the press. The press includes feeding mechanism for feeding the glass to the mold, screw-plunger inserting mechanism for inserting the screw-plunger in the glass in the mold, mechanism for transferring the screw-plunger from the rack to and inserting it in the actuating rod, mechanism for unscrewing the screw-plunger from the mold at the proper time, mechanism for carrying the screw plunger from the unscrewing mechanism to the screw-plunger rack, mechanism for opening and closing the mold, and insulator-removing mechanism for removing the insulator from the mold and depositing it on a suitable carrier or other device for conveying it to the leer.

Referring to Fig. 2, A is the place at which the screw-plunger is inserted in the mold. B is the place where the screw-plunger is unscrewed from the mold. C is the place where the insulator is removed from the mold, and D is the position where a fresh charge of glass is inserted in the mold. I will describe the various mechanisms already mentioned in the order just stated. 14 and 15 are arms which are mounted at one end of the standard 12, and are made adjustable up and down the standard 12 by means of bolts and nuts as shown, or in any other way. 16 is a rod which is carried by the outer ends of the arms 14 and 15 and is held in a vertical position thereby, as shown in Fig. 8. 17 and 18 are similar arms which are carried at their inner ends by the post 13, and which, at their outer ends, support the rod 19, corresponding with the rod 16. 20 is a cross head provided with bearings at its ends to receive the rods 16 and 19 so that the crosshead may move up and down on said rods. This crosshead is provided with a central opening 21 in which works the roller 22 which is fastened in any suitable manner to the wheel or disk 23 so as to be eccentric therewith. The crosshead 20 has a rod 24 projecting from its upper side carrying a weight 25. To the lower side of the crosshead 20 is attached an actuating rod 26. The actuating rod 26 is mounted in and moves up and down in a bearing in the crosspiece 27 which is fastened at one end to the rod 19, and at the other end to the rod 16, see Fig. 8. The actuating rod carries at its lower end a plate 29 to which is suitably fastened a hollow former 30 adapted to receive and engage with the upper end of the screw plunger 31. 32, 32 are springs the upper ends of which are fastened in any suitable way to the former (see Figs. 5 and 8), and the lower ends of which are adapted to move back and forth in the slots 33 made in the former. The lower ends of the spring 32 are bent, as shown, to engage with a groove in the upper end of the screw-plunger. By this means the screw-plunger can be inserted in the former by being pressed upwardly into the same, until the screw-plunger has been caught by the springs 32, and after the screw-plunger has been forced into the glass by means of the actuating rod, and the actuating rod is afterward raised, the screw-plunger will be caused to slip out of its spring engagement with the former and will be held in the glass in the mold. 34 is the follower. It is supported from the plate 29 (see Figs. 4 and 5) by means of the bolts 35 which are screwed into the follower 34 and which move up and down in bearings in the plate 29, and are provided with nuts at their upper end to prevent the bolts 35 from slipping through the plate 29. The bolts 35 are surrounded by the springs 36 which tend to press the follower downwardly. The follower is provided with a central opening in which the former 30 moves up and down. 37, 37 are rods which are adapted at the proper time to press downwardly on top of the follower 34 to hold it in place on top of the mold, as shown in Fig. 8, and which are afterward pressed apart to release the follower plate and permit it to rise. The upper end of the rod 37 is screwed into a lever 38 (see Fig. 8), one end of which is pivoted to the crosspiece 27, as shown, and the other end of which is forced downwardly by the coiled spring 39, the upper end of which is attached to the crosspiece 27. It will be seen that the spring 39 tends to press the lower ends of the rod 37 inwardly toward each other. 40, 40 are bearing pieces which are screwed or otherwise fastened to the upper side of the follower against which the lower ends of the rod 37 bear. Each rod 37 is provided with a cam ring 41 which is screwed to the rod 37 and can be adjusted up and down on the same. Plate 29 is provided with slots on its opposite sides adjacent to the rods 37, and has a bearing piece 42 made of steel, or other suitable material, fastened to it and projecting into the slot. This bearing piece is adapted to come into contact with the cam ring 41 when the plate 29 is raised and lowered. It will be seen that when the plate 29 is raised or lowered so as to bring the pieces 42 in contact with the cam rings 41, the rods 37 will be forced outwardly against the pressure of the springs 39 and so as to release the follower 34 and permit it to be lifted away from the mold.

The wheel 23 by means of which the actuating rod is lifted, is mounted on the shaft 43 (see Figs. 1–5). This shaft turns in bearings 44, 44 which are supported in any suitable manner on the crossbars 45 which in turn are supported by the brackets 46, 46 which are supported by the standards 12 and 13, as shown. 47 is a worm wheel adapted to turn loosely on the shaft 43, or to be fastened to said shaft by means of a clutching mechanism 48. The worm wheel 47 is driven by the motor 49 mounted on the base extension 2. Any suitable form of motor may be used for this purpose. The motor shaft is provided with a pinion 50 (see Figs. 1 and 27) which meshes with a gear 51 on the shaft 52 adapted to revolve in bearings suitably supported on the frame of the machine. 53 is a small sprocket wheel attached to the shaft 52. 54 is a chain connecting the sprocket wheel 53 with a larger sprocket wheel 55 mounted on a shaft 56, which revolves in bearings in the arms 57 which are supported by the arms 58 which are suitably fastened to the crossbars 45 resting upon the brackets 46. The shaft 56 carries the worm 59 which engages with and drives the worm wheel 47.

The construction of the clutching mechanism 48 is shown in Figs. 5 and 40–44. Any suitable form of clutch may be employed for this purpose. In the particular form shown 60 is a sleeve which is fastened to the shaft 43 by means of the key 61, as shown. 62 is an outer sleeve encircling the inner sleeve fastened to the latter by means of the bolts 63. 64 is a longitudinal groove in these two sleeves formed partly in one sleeve and partly in the other, in which the key 65 is adapted to move back and forth. 66 is a spring in the end of the groove 64 tending to press the key 65 toward the worm wheel 47. The worm wheel 47 is provided with grooves 67, see Fig. 44, into which the end of the key 65 is adapted to project. When the key projects into one of these grooves the worm wheel 47 is locked to the shaft 43. 68 is a dog which is adapted to force the key 65 out of engagement with the worm wheel 47. This dog is carried on the upper end of the rod 69 which moves up and down in a bearing in the bracket 70 which is supported from the plate 71 carried by one of the cross-bars 45. The upper face of the dog 68 is concave in form, as shown in Fig. 41, and one end of the dog is cut away, as shown in Figs. 41 and 43, to form a sharp point or edge at 72. The key 65 is provided with a slot 73 which is of such a length as to project beyond the edge of the open end or groove 74 formed between the end of the outer sleeve 62 and the ring 75 which is screwed, or otherwise fastened, to the sleeve 60, as shown in Fig. 42. The dog 68 is pressed upwardly by means of the spring 76 which, at its lower end, bears against the bracket 70, and at its upper end bears against a collar fastened to the rod 69. 77 is a pin projecting from the ring 75 and adapted to bear against a pin 78 projecting from the side of the dog 68. When the clutch has been operated in the manner described so as to disconnect the shaft 43 from the worm 47, the shaft 43 and its connected parts will continue to rotate by reason of its momentum, until the pin 77 strikes the pin 78. This will bring the shaft 43 to a stop always at the same position, and the position of the pin 77 on the ring 75 can be so adjusted that the shaft 43 and its connected parts will be stopped at a suitable point. As a result of this when the shaft 43 is again clutched to the worm wheel 47, the different parts of the machine which are controlled by the shaft 43 will be started into operation from the best position. When the dog 68 is drawn down so as to permit the parts to be clutched together, the pin 78 is no longer in the path of movement of the pin 77. The rod 69 is connected at its lower end with the lever 80 (see Fig. 5) which is pivoted at its rear end as shown, and has the pedal 81 at its outer end. 82 is a spring tending to hold the lever 80 in its highest position and tending therefore to unclutch the worm 47 from the shaft 43. When the operator desires to clutch the shaft 43 to the worm wheel 47, he presses down on the pedal 81.

Assuming that the screw-plunger has been inserted in the former by the mechanism to be hereinafter described, and that the actuating rod is in its highest position as represented in Figs. 5 and 9, the cam wheel 23 is revolved in the direction indicated by the arrow in Fig. 9, and the crosshead 20 and the actuating rod 26 are moved downwardly by reason of the weight of the parts, including the weight 25. Meanwhile the table 4 has been revolved so as to bring a charged mold immediately under the actuating rod. The follower 34 moves downwardly until it strikes the top of the mold. The former continues to move downwardly, forcing the screw-plunger down into the glass and causing the springs 36 between the follower and the plate 29 to be compressed. When the plate 29 has passed below the cam rings 41 on the rods 37, the lower ends of the rods 37 are forced inwardly by the springs 39 so as to bear on top of the pieces 40 and hold the follower down in place. The former and screw-plunger are forced down by the weight of their connected parts until the glass in the mold is made to fill the entire space under the follower and former and around the plunger so as to form or mold a complete insulator. As the wheel 23 continues to revolve the roller 22 comes in contact with the crosshead 20 and lifts the same, thus raising the actuating rod and former. The screw plunger is held by the glass in the mold so that it slips out of engagement with the springs 32 and is disconnected from the former. When the bearing pieces 42 on the plate 29 in their upward movement strike the cam rings 41, they force the rods 37 outwardly so as to move the lower ends of the rods 37 beyond the edge of the follower. The follower is then lifted away from the mold by the bolts 35. The insulator is thus molded and the mold, containing the insulator and the screw-plunger within it, is ready to be moved with the table until, in the revolution of the table, they are finally brought to the position B where the screw plunger is unscrewed.

The mechanism for inserting the screw-plunger in the actuating rod is shown in Figs. 2, 3, 5, and 8 to 13 inclusive. 83 is a cam plate which is secured in any suitable manner to the crosshead 20. This cam plate has a cam groove 84 which, in the form shown, is made by providing a strip 85 (see Fig. 10) and supporting it beyond the edge of the main part of the cam plate by means of the supporting arms 86 suitably bolted or fastened to the plate 83 and the strip 85. The cam plate 83 moves up and down with the crosshead 20. 87 is a rock shaft. 88 is a collar secured to said shaft, and from this collar projects the arm 89 carrying at its outer end the cam piece or roller 90. This cam roller is adapted to travel in the cam groove 84, and thus to rock the shaft 87. 91 is a spring connected at one end to the arm 89, and at the other end to the lifting rod 92. The spring 91 operates against the cam 83 and tends to rock the shaft 87 in the opposite direction. The shaft 87 is adapted to move up and down in a bearing in the bracket 93 which is adjustably fastened to the rod 19. To the lower end of the shaft 87 is attached an arm 94 which carries at its outer end the cup 95 for transferring the screw-plunger from the rack 96 (see Fig. 2) to the actuating rod. This cup is constructed as shown in the drawings, particularly Figs. 9 to 13, and consists of a body 97 of a size suitable for holding the screw-plunger, and two retaining pieces 98 which are pivoted at their outer ends in slots or grooves in the wall of the body 97, and the spring 99 which is fastened at its middle point to the back of the cup, and the front ends of which bear on the outer surface of the free ends of the retaining pieces 98, and tend to force those pieces inwardly so as to lock or hold the screw plunger in the cup. The pieces 98 bear against the screw plunger with a yielding pressure so that the screw plunger may be forced into the cup or forced out of the cup by the action of the arm 94. 100 is a collar suitably fastened to the shaft 87, from which projects a pin 101. 102 is a collar fastened to the shaft 87. 103 is an arm which is fastened at one end to the lifting rod 92, and which is forked at its outer end so as to encircle the shaft 87 between the collars 88 and 102 (see Figs. 11-13). The rod 92 is adapted to move up and down in bearings in the arms 17 and 18 (see Fig. 11). At its upper end it is provided with a piston 104 which is adapted to move up and down in a dashpot 105, which may be filled with a suitable liquid or operated simply by air. 106 is a dog which is fastened to a collar on the rod 92 as shown. 107 is a projecting piece fastened to the wheel 23 by any suitable means, and projecting beyond the periphery of the wheel, as shown, and in such a position as to engage with the under side of the dog 106 as the wheel revolves, and to lift the dog and thereby lift the rod 92. It will be seen that when the rod 92 is lifted in this way, it will, by means of the arm 103, raise the shaft 87.

When the projecting piece 107 has passed from underneath the dog 106, the rod 92 will fall, and with it the shaft 87. The wheel 23 is also provided with a cam piece or projection 108 (see Figs. 9 and 11). As the cam wheel revolves, this cam piece 108 will strike the upper end of the pin 109 which is adapted to move up and down in bearings in the bracket 110, which is suitably secured at one end to the crossbar 45 (see Fig. 5), and also in a bearing in the bracket 111 which is suitably fastened to the crosspiece 27. The lower end of the pin 109 bears against one end of the lever 112 (see Figs. 9 and 11) which is pivoted to lugs 113 projecting upward from the crosspiece 27. The other end of the lever 112 extends underneath the end of a cross lever 114 which is pivoted at or near its central point, see Figs. 9 and 10, to lugs 115 projecting upwardly from the crosspiece 27. The other end of the lever 114 projects downwardly against the pin 116, which is connected with one end of the stop lever 117 (see Fig. 10), which is pivoted at about its central point to the bracket 118, which is bolted or in any suitable manner fastened to the crosspiece 27. 119 is a spring placed between the other end of the lever 117 and the under side of the crosspiece 27, and tends to force that end of the lever down and thereby force the pin 116 up against the end of the lever 114. When the pin 116 is in its highest position the end of the lever 117 is on a level with the pin 101 and prevents the pin 101 from being moved toward the bracket 118 as it would otherwise be moved by the action of the spring 91 which tends to rock the shaft 87 in such a direction as to move the pin 101 toward the bracket 118. 120 is a guide piece or arm which is pivoted at its lower end to the bracket 118 (see Figs. 8, 9, 10, 13). From its pivoted point it is curved upwardly and toward the inner face of the bracket 118, as clearly shown in Figs. 9 and 10, and gradually widens toward its upper end. When the pin 101 is in its lowest position, as shown in Fig. 9, it is below the level of the lower end of the guide piece 120 so that when the end of the lever 117 is moved down out of the path of the pin 101 the pin 101 may swing underneath the guide piece 120 and against the bracket 118, and may then be lifted up along the face of the bracket 118 until it lifts the upper end of the guide-piece 120. When it passes the upper end of this piece the guide-piece 120 will resume its normal position, and when the pin 101 is again lowered instead of moving down in the same path in which it rose, it will move along the upper surface of the piece 120 and will thus be forced away from the bracket 118, thus turning the shaft 87 until the pin 101 will again resume the position shown in Fig. 9. 121 is a pin attached to the shaft 87 and working up and down in a groove 122 in the bracket 93. This groove is so shaped that when the shaft 87 is rocked by the spring 91, the motion of the shaft will be stopped at just the proper place to bring the cup 97 immediately under the center of the actuating rod.

The operation of the parts just described is as follows: The actuating rod descends to force a screw plunger into the mold, the cam roller 90 enters the groove 84 of the cam 83, and the shaft 87 is thereby rocked in such a direction as to throw the arm 94 away from the actuating rod and to force the cup 97 against the lower end of one of the screw plungers which is held in the rack 96. The lower end of the screw plunger is thus forced into the cup 97, the retaining pieces 98 of the cup being forced back against the action of the spring 99 until the lower end of the plunger has been forced into the cup, and the retaining pieces being then forced back into place by the spring 99 so as to encircle the lower end of the screw plunger. When the actuating rod rises the cam roller 90 moves down in the groove of the cam 83, and the shaft 87 is thus rocked in the opposite direction until the pin 101 is brought to bear against the end of the lever 117. As a result of this, the cup 97 is swung away from the rack 96, and carries with it the screw plunger. As the wheel 23 continues to revolve so as to lift the actuating rod, the cam piece 108 strikes the rod 109, and forces it down, and by the succession of levers already described, forces the pin 116 downward and thus forces the end of the lever 117 out of the path of the pin 101. The shaft 87 is then rotated still further by the action of the spring 91 until the pin 121 strikes the edge of the groove 122 in the bracket 93, which limits the rotation of the shaft 87. At this time the cup 97, with its screw plunger, is immediately underneath the center of the former 30. As the cam wheel 23 continues to revolve, the piece 107 strikes the dog 106, and thereby lifts the rod 92 and consequently lifts the shaft 87. As the eccentric or cam roller 22 which bears against the upper wall of the opening 21 in the crosshead 20 is nearer to the center of the wheel 23 than the bearing surface or edge of the piece 107, it follows that the rod 92, and therefore the shaft 87, move upward faster than the actuating rod and former. These relative motions are so adjusted that the cup 97 will force the screw plunger upwardly into the lower end of the former 30, until the upper end of the screw plunger has been caught by the springs 32 in the former. The screw plunger is thereby inserted in the former during the upward motion of the actuating rod. When the projecting piece 107 has passed from underneath the dog 106, the rod 92 and the shaft 87 fall by reason of their own weight, and as the shaft 87 descends the pin 101, which is attached to it, moves down over the curved surface of the guiding piece or arm 120, and is thus moved away from the bracket 118, and so rocks the shaft 87 in such a direction as to throw the arm 94 and the cup 97 back into their normal position such as is represented in Fig. 12. The parts are now in place for a repetition of the operation just described. In this way the screw plunger is carried from the rack 96 and inserted in the former, and upon the next downward stroke of the actuating rod the screw plunger is inserted in a mold as already described.

The mechanism for unscrewing the screw plunger from the insulator in the mold, when the mold reaches the position marked B in Fig. 2, is particularly shown in Figs. 1, 2, 5, and 14 to 26 inclusive. 123 is a rotary spindle by means of which the screw plunger is unscrewed from the insulator. This rotary spindle is adapted to move up and down in bearings in the block 124 and the arm 125, which are suitably supported from the bracket 126, see Fig. 18. 127 is a beveled gear which is fastened by means of a feather and groove connection to the spindle 123 so as to revolve with the spindle but so that the spindle may move up and down in the gear. The stem of the gear 127 turns in a bearing in the block 124 as shown, and rests upon a fiber disk 128, or other suitable antifriction device. The gear 127 is held in place vertically by the sleeve 129 encircling the rotary spindle and bearing at its upper end against the lower surface of the arm 125. 130 is a beveled gear meshing with the gear 127 and fixed upon the shaft 131 which is mounted in bearings supported from the bracket 126, see Fig. 18. At the other end of the shaft 121 is a beveled gear 132, meshing with a beveled gear 133 at the upper end of the shaft 134 which turns in bearings in the post 6, and the bracket 126 which is fastened to the top of said post. The lower end of the shaft 134 is supported in a bearing in a block 135 which is fastened to the base 1, see Fig. 5. 136 is a pinion fastened to the shaft 134 and meshing with the gear 137 which is fastened to the shaft 138 (see Fig. 6) which revolves in a bearing 139 carried by the support 7. At the outer end of the shaft 138 is a pinion 140 which meshes with an idler gear 141 turning in bearings supported from the frame of the machine, which idler meshes with the gear wheel 142 mounted on the shaft 143. The shaft 143 turns in bearings 144, suitably supported from the frame of the machine, see Fig. 6. 145 is a worm wheel turning on the shaft 143 and adapted to be fastened to the said shaft by means of the clutch 146, or any other suitable form of clutch. The particular form of clutch shown is the same in construction as the clutch which has already been described as being used to connect the shaft 43 with the worm wheel 47, and which is shown in detail in Figs. 40 to 44. Any other suitable form of clutch might be employed in place of the clutch 146. 147 is a worm which is adapted to engage with the worm wheel 145 and which is mounted on a shaft 148 supported in bearings suitably fastened to the frame of the machine, see Figs. 3 and 5. At the rear end of the shaft 148 is a beveled pinion 149 which meshes with a beveled gear 150 fastened to the lower end of the vertical shaft 151 which is mounted in bearings suitably supported from the frame of the machine and which carries at its upper end a beveled pinion 152 which meshes with a beveled gear 153 fastened to the shaft 56. The shaft 56 is driven from the motor 49 by the mechanism already described. It will be seen therefore that when the worm wheel 145 is clutched to the shaft 143, the rotary spindle 123 of the unscrewing mechanism is continuously rotated from the motor 49. Its rotation ceases when the clutch 146 is operated to disengage the worm wheel 145 from the shaft 143.

Referring to Figs. 14 and 18, 154 is a collar which is fastened near the lower end of the spindle 123 and which is beveled or tapered on its periphery as shown. 155 is a socket which is screwed to the lower end of the rotary spindle 123 and is adapted to receive and engage the upper end of the screw plunger. This socket is provided on one side with a slot in which moves a pivoted dog 156. The lower end of the dog is adapted to engage with a hole or recess in the upper head of the screw plunger, as shown. There are several of these recesses placed circumferentially around the plunger as shown. 157 is a spring which is fastened at its upper end to the socket 155 and which bears at its lower end against the dog 156, tending to press it inwardly. It will be seen that the lower end of the dog 156 is pressed into the hole or recess in the screw plunger by yielding pressure. The lower end of the spindle 123 is provided with a recess 158 in which a plug 159 moves up and down. The plug is connected with the spindle 123 by the pin 160 which is fastened to the plug and moves up and down in slots in the side of the spindle. The lower end of the plug 159 is provided with a pin 161 which is adapted to fit into a recess in the upper end of the screw plunger. It will be seen that when the plug 159 is forced downwardly in the rotary spindle, it will press the screw plunger out of the socket 155, forcing the dog 156 out of engagement with the screw plunger against the pressure of the spring 157. 162 is a piston fastened to the spindle 123 and adapted to move up and down in the dashpot 163 formed in or carried by the arm 125. The bottom of the dashpot is provided with a rubber washer 164. The rotary spindle drops of its own weight and the purpose of this construction is to check the last part of the downward motion of the spindle. The spindle is provided at its upper end with a sleeve 165 which has a beveled surface on the outside as shown.

The rotary spindle is lifted vertically as a result of its revolution by means of the threaded device or half nut 166, see Figs. 14, 18–23. This half nut is adapted to slide back and forth in a recess 167 in the block 124, see Fig. 21. When it is in its innermost position the screw thread of the half nut engages with the screw thread on the spindle 123, and as the spindle is revolved it is thereby lifted. The pitch of the thread on the nut 166 is made to exactly conform to the pitch of the thread on the screw plunger. This prevents the distortion or breaking of the insulator during the unscrewing of the screw plunger therefrom. The half nut is reciprocated by the lever 168 which is pivoted at one end to the block 124 in the slot or recess in said block, and which passes through a slot 169 in the half nut, see Fig. 23. As the lever 168 is moved back and forth on its pivot the nut is moved inwardly or outwardly in the block 124. The free end of the lever 168 is adapted to engage with a shoulder on the lever 170. When the lever is in engagement with this shoulder the half nut is held out of engagement with the thread on the rotary spindle. 171 is a spring fastened at one end to the lever 168, and at the other end to an arm 172 which is supported from the bracket 126. The spring 171 tends to draw the arm 168 toward the rotary spindle. The lever 170 is pivoted to the arm 172, as shown. 173 is a spring fastened at one end to the free end of the lever 170, and at the other end to the arm 174 which is attached to the bracket 126. The spring 173 tends to press the lever 170 against the end of the lever 168. The free end of the lever 170 is moved in a direction away from the end of the lever 168 by the pin 175 which projects downwardly from the outer end of the arm 176 which is fastened at its inner end to the rock shaft 177. The shaft 177 is mounted in bearings 178, (see Fig. 14), the lower one of which is fastened to the block 124, and the upper one of which is suitably fastened to the upper end of the arm 125. The shaft 177 is held in position vertically by means of the collars 179 which are secured to the shaft and rest against the bearings as shown. 180 is an arm attached at one end to the upper end of the shaft 177, and provided with a bearing pin or surface 181 at its other end which bears against the outer surface of the piston 162 or the sleeve 165 connected with the rotary spindle. 182 is a spring which is screwed or otherwise fastened at one end to the upper collar 179, (see Figs. 14 and 16), and the inner end of which bears against the pin 183 which projects upwardly from the bearing 178. When the rotary spindle descends the beveled surface at the upper end of the sleeve 165 forces the free end of the arm outwardly and thus rocks the shaft 177 in such a direction as to cause the pin 175 to strike the free end of the lever 170 and force it out of engagement with the lever 168. The spring 171 then moves the lever 168 on its pivot and forces the half nut into engagement with the screw thread on the rotary spindle. Further revolution of the rotary spindle causes the same to rise, and as the upper enlarged part of the sleeve 165 passes above the arm 180, the spring 182 rocks the shaft 177 back to its normal position as indicated in Figs. 22 and 23, and the spring 173 then forces the lever 170 against the end of the lever 168 so that the shoulder on the lever 170 is in position to engage the free end of the lever 168 when the latter lever is moved into its outward position. 184 is a curved lever (see Fig. 21) which is pivoted at its upper end to projections on a plate 185 which is fastened to the block 124. The lever 184 is pivotally connected near its middle point with the half nut 166, as clearly shown in Fig. 21. The lower end of the lever 184 is beveled, and it is adapted to engage with the beveled surface of the collar 154 which is fastened to the rotary spindle. When the rotary spindle rises the collar 154 comes into contact with the lower beveled end of the lever 184, and moves the same outwardly, and thus causes the half nut to disengage the screw thread on the rotary spindle. This terminates the upward motion of the rotary spindle. The outward motion of the lever 184 causes the free end of the lever 168 to move outwardly and to become again engaged with the shoulder on the lever 170, as shown in Fig. 23. 186 is a rock shaft which is supported in bearings 187 which are fastened respectively to the dashpot 163 and the block 124. This rock shaft is held from vertical movement by the collar 188, which is suitably fastened to the same. 189 is an arm fastened to the lower end of this rock shaft and projecting into the path of the pin 190 which projects upwardly from one of the jaws of the mold 5. 191 is an arm which is connected at one end with the rock shaft 186, and the free end of which is provided with a shoulder, as shown in Fig. 14, adapted to project underneath the lower end of the piston 162 so as to hold the rotary spindle in its highest position and prevent it from descending until the proper moment in the operation of the machine. 192 is a coiled spring encircling the shaft 186 and fastened at its lower end to the upper bearing 187, and at its upper end to a collar 193 which is secured to the shaft 186. The spring 192 is normally under tension and tends to turn the rock shaft in such a direction as to cause the free end of the arm 191 to be pressed toward the rotary spindle. 194 is a stop pin fastened to the collar 188 and projecting into the slot in the block 124, and adapted to limit the throw of the rock shaft 186 in that direction, so as to prevent the upper edge of the arm 191 from being thrown under the piston 162 on the rotary spindle.

The operation of this unscrewing mechanism is as follows: The rotary spindle being in its highest position as represented in Fig. 14, the mold table 4 is moved by mechanism to be hereinafter described, so as to bring one of the molds 5 with its contained insulator and screw plunger, immediately under the rotary spindle. As the mold passes under the rotary spindle the pin 190 on the mold strikes the arm 189 and rocks the shaft 186 in such a direction as to swing the arm 191 out of engagement with the plunger 162 on the rotary spindle. The weight of the rotary spindle causes it to descend until the lower end of the piston 162 rests upon the washer 164 at the bottom of the dashpot 163. In this downward motion the upper end of the screw plunger which is in the mold underneath, passes into the socket 155 at the lower end of the rotary spindle, and is locked in that position by the dog 156, the lower end of which projects into one of the recesses on the screw plunger. The pin 161 projects into the central hole in the upper end of the screw plunger, and the plug 159 is forced upwardly in the lower end of the rotary spindle into the position shown in Fig. 18. At the end of the downward movement of the rotary spindle, the beveled surface at the upper end of the sleeve 165 forces the arm 180 outwardly and rocks the rock shaft 177, and throws the half nut 166 into engagement with the screw thread on the rotary spindle in the manner already described. The rotary spindle and the screw plunger are thus rotated together, and at the same time are forced upwardly, the screw plunger being thus unscrewed from the insulator in the mold without distorting the same. Near the end of the upward motion of the rotary spindle the beveled surface on the collar 154 strikes the lower end of the curved lever 184, as already explained, and thus disengages the half nut from the rotary spindle, thus arresting the upward motion of the rotary spindle. During the upward motion of the rotary spindle the rock shaft 177 has resumed its normal position as already explained, and when the half nut is disengaged from the thread on the spindle, it is locked in its outward position by the lever 170 as already set forth. Before the half nut is disengaged from the rotary spindle the pin 190 has disengaged the arm 189 on the rock shaft 186, and the arm 191 at the upper end of that rock shaft has been thrown back into the position represented in Fig. 14 so as to be ready to engage the lower end of the piston 162. When the rotary spindle is raised to its highest position, the shoulder on the arm 191 slips under the lower surface of the piston 162, and thus holds the rotary spindle in its raised position until another mold, with its insulator and plunger, is brought underneath the rotary spindle for a repetition of the operation. When the rotary spindle rises to such a point that the pin 160 strikes the lower surface of the block 124, the plug 159 is forced downwardly in the recess 158 in the lower end of the rotary spindle, and thus forces the screw plunger out from the socket 155 into the cup 195 which has by this time been brought under the rotary spindle, by mechanism to be hereinafter described, for the purpose of receiving the screw plunger and transferring it to the holding rack 96. 196 is a lever which is pivoted in a slot in the lower part of the dashpot 163, and which is provided at its outer end with a handle, and which is adapted to project into an annular groove 197 in the rotary spindle, see Fig. 18. By moving this lever in by hand when the rotary spindle is in its highest position, the rotary spindle can be locked permanently in that position, and thus put out of operation if desired.

The mechanism for carrying the screw plunger from the unscrewing mechanism to the screw plunger rack, is shown in Figs. 1, 2, 4, 6, 14, 24—27, and is as follows: Referring to Figs. 24 and 25, 198 is a rock shaft which is mounted in bearings in the forked arm 199 which is suitably fastened to the bracket 126. The downward motion of the shaft in these bearings is limited by the collars 200 and 201, which are suitably fastened to the shaft. To the lower end of the shaft is fastened the arm 202 which carries the cup 195 which is adapted to receive the screw plunger when it is disengaged from the lower end of the rotary spindle, and to transfer it to the rack 96. The construction of this cup is preferably the same as that of the cup 97, shown in Figs. 12 and 13 and already described, and which is used for transferring the screw plunger from the rack to the actuating rod. The rock shaft 198 is moved back and forth through such a radius of movement and in such timing with reference to the other parts of the machine that the cup 195 will be brought under the rotary spindle at the proper time to receive the screw plunger which is disengaged therefrom, and will then carry the screw plunger and insert it in the rack 96, and will then repeat this operation continuously. The rocking mechanism is as follows. 203 is an arm connected at one end with the upper end of the rock shaft 198. 204 is a rod pivoted at one end to the arm 203, and at the other end to the arm 205, which is fastened at its other end to the rock shaft 206, see Figs. 24 and 25. This rock shaft turns in bearings in brackets 207 which are suitably fastened to the standard 12, see Fig. 4. The rock shaft is supported in bearings by the collar 208 fastened to said shaft, and which bears against the upper bracket 207. 209 is a coiled spring which is under tension, the upper end of which is fastened to the upper bracket 207, and the lower end of which is fastened to the collar 210 on the rock shaft 206. The spring 209 is so arranged as to rock the shaft 206 in such a position as to move the rod 204 in a direction from right to left, as the parts are shown in Figs. 24 and 25. To the lower end of the shaft 206 is connected an arm 211, see Fig. 25, the outer end of which is connected, by means of a pivoted link 212, with one end of the lever 213. The lever 213 is pivoted to the upper end of a support 214 which is suitably fastened to the frame of the machine. As shown in Figs. 24 and 25 the lever 205 is made in two parts, which are bolted together so as to inclose the pivot. The free end of the lever 213 projects underneath the revolving disk 215 and into the path of a pin 216 projecting downwardly from said disk. The disk 215 is supported on the upper end of, and turns with, the shaft 217, which is supported in a bearing 218 which is suitably bolted or otherwise fastened to the frame of the machine, as shown. 219 is a beveled gear fastened to the shaft 217, and arranged to mesh with the beveled gear 220 which is fastened to the end of the shaft 143, see Fig. 6.

The disk 215 revolves in the direction shown by the arrow in Fig. 25. When the pin 216 strikes the free end of the lever 213, it moves the lever on its pivot and thereby moves the rock shaft 206 in such a direction as to throw the rod 204 in a direction from left to right in Figs. 24 and 25. This causes the rock shaft 198 to be turned in such a direction as to move the arm 202 and its cup 195, toward the rack 96. When the pin 216 has slipped past the end of the lever 213, the lever is thrown back to its original position, and the rod 204 is moved back in a direction from right to left in Figs. 24 and 25 by the operation of the spring 209. 221 is a rock shaft, (see Figs. 24, 26), which is curved at its lower end as shown in Fig. 24, and thus adapted to engage with the beveled surface of the collar 154 during the upward motion of the rotary spindle. The shaft 221 is adapted to turn in bearing pieces 222 bolted to the face of the block 124. 223 is an arm fastened to the upper end of the shaft 221. Its outer end is adapted to engage with one end of the lever 224. The latter lever is pivoted near the middle to a lug projecting from the arm 125. 225 is a spring, the inner end of which bears against or is fastened to the arm 125, and the outer end of which is connected with one end of the lever 224. The spring 225 tends to press outwardly the end of the lever 224 with which it is connected, so as to force it into the path of the arm 226 which is connected with the rock shaft 198, see Fig. 26, so as to rock therewith. The end of the lever 224 operates as a stop to limit the motion of the arm 226, and thus to limit the throw of the rock shaft 198 until the end of the lever 224 has been moved out of the path of the arm 226, as hereinafter explained. 227 is another arm fastened at one end to a collar 228, which is fastened to the rock shaft 198 so that the arm 227 swings with the rock shaft. The outer end of the arm 227 is adapted to strike against a pin 229 which projects upwardly from a bracket 230 which is bolted to the upper surface of the forked arm 199. In this way the throw of the shaft 198 under the influence of the spring 209 is limited so that when the cup 195 is thrown toward the rotary spindle, it will be stopped in a position immediately under the same. 231 is a dog which is pivoted at one end, as shown in Fig. 26, to the bracket 230, its other end being free to move up and down and resting when in its lowest position, upon the surface of the flat part of the bracket 230. The upper surface of this dog is curved, as shown in Figs. 24 and 26. The purpose of the dog is to lift the arm 226 when it is being swung in a direction from right to left in Fig. 26, and so to lift the rock shaft 198 at the appropriate time. When the arm 226 has swung beyond the pivoted end of the dog 231, the arm 226 and the rock shaft 198 drop to their lowest position by reason of the weight of the parts, and when the arm 226 swings in the reverse direction, it passes under the dog 231, lifting the free end of it sufficiently for this purpose.

The operation of this part of the apparatus is as follows: The arm 202 and its connected parts being in the position represented in Figs. 25 and 26, namely, in the intermediate position between the rotary spindle and the rack 96, the rotary spindle is raised in the manner already described until the collar 154 strikes the lower curved end of the rock shaft 221. The beveled surface of the collar 154 forces the lower end of the shaft 221 outwardly from the rotary spindle, and so turns the shaft 221 in such a direction as to move the free end of the arm 223 in a direction away from the arm 125, which forces the adjoining end of the lever 224 outwardly, and moves the other end of the lever 224 inwardly against the force of the spring 225, and thus releases the arm 226. The spring 209 on the rock shaft 206 is now free to act, and turns the rock shaft 206 in such a direction as to move the rod 204 in from right to left in Fig. 26, and thus rock the shaft 198 in such a direction as to turn the arm 202 toward the rotary spindle and cause the cup 195 to be brought immediately under the lower end of the rotary spindle so as to be in a position to receive the screw plunger when it is forced out from the lower end of the rotary spindle in the manner already described. The cup 195 is prevented from being thrown past this central point, and is thus centralized under the rotary spindle by the action of the pin 229 in limiting the motion of the arm 227, and thus limiting the throw of the rock shaft 198. The screw plunger is forced out from the lower end of the rotary spindle and caught in the cup 195 in the manner already described. Thereafter the pin 216 on the disk 215 strikes the free end of the lever 213, and thus rocks the shaft 206 in the manner already explained, and moves the rod 204 in a direction from left to right in Figs. 24–26, and so throws the rock shaft 198 in the opposite direction, and moves the cup 195 with its contained screw plunger, over to the rack 96. During the motion of the arm 202 in this direction, the rock shaft 198 and the arm 202 are raised, owing to the fact that the arm 226 rides up on the curved surface of the dog 231. By this means the screw plunger is lifted up by the cup 195 to such a position that the groove on the upper end of the screw plunger will register with one of the recesses 232 in the rack 96. The rack 96 is turned by mechanism, to be hereinafter described, in such a manner that one of these recesses 232 will, at the proper moment, be in line with the upper end of the screw plunger so as to receive the screw plunger. When the arm 226 passes beyond the end of the dog 231, the arm and the shaft 198 drop, by reason of their weight, to their lowest position, and the cup 195 is thus withdrawn from the lower end of the screw plunger, and the screw plunger is left suspended in one of the recesses 232 of the rack 96. The spring 209 then acts to throw the rock shaft in the other direction until the end of the arm 226 again rests against the end of the lever 224. This brings the arm 202, with the cup 195, back to their intermediate or normal position ready for another operation. Before the arm 202 has been swung back to this position, the rotary spindle has again descended so as to free the lower end of the rock shaft 221 from engagement with the collar 154, and as a result of this the spring 225 has forced the end of the lever 224 outwardly so as to be in a position to act as a stop to limit the motion of the arm 226, and thus to stop the turning of the rock shaft 198, and of the arm 202, in this intermediate position.

The rack 96 consists of a plate or table 233, which is adapted to revolve around, or turn upon, the post 6, see Fig. 18, and the grooved pieces 234, which are screwed to the top of the plate 233, (see Figs. 18 and 26), and which form between them the recesses 232 to receive the screw plungers. The rack is turned by the following means. The plate 233 is provided with an annular groove 235 in which small pieces of metal 236 are bolted or screwed at suitable and regular intervals. These small pieces 236 operate like the teeth of a ratchet. 237 is an arm which is connected, by means of a pivoted swivel connection as shown, to the outer end of the arm 238 (see Figs. 24 and 25), which latter arm is fastened to the rock shaft 198. The other end of the arm 237 is provided with a pin or tooth 239, which is adapted to engage with the pieces 236 in the groove 235. The arm 237 is provided with a weight 240 to press the tooth 239 down into the groove 235. The edge of the tooth 239 on the side of the weight 240 is beveled so that when the arm 237 is drawn backwardly, the pin 239 will slip over the pieces 236. This device is in effect a pawl and ratchet of a particular construction. When the rock shaft 198 is turned in such a direction as to throw the arm 202 away from the rack, the pin 239 is drawn backwardly in the groove 235 and slips over one of the pieces 236. When the rack 198 is thrown in the opposite direction, the pin 239 engages with the edge of the piece 236 immediately in front of it, and turns the rack 96 in the direction of the arrow shown in Fig. 26. These parts are so adjusted and arranged that this throw of the rack 96 brings one of the recesses 232 of the rack in proper position to receive the screw plunger which is carried toward it by the cup 195. This motion of the rack also serves to bring one of the screw plungers, which had been previously transferred to the rack, into the proper position to be engaged by the cup 95 heretofore described, for the purpose of being transferred from the rack to the actuating rod in the manner already described.

To make sure that the screw plunger, after having been engaged in one of the recesses 232 in the rack, is forced into the inner end of said recess and securely caught therein, I mount a curved spring 241 over the top of the rack 96, see Figs. 1 and 3. This spring is supported from the arm 242, which is screwed or otherwise fastened to the bracket 126. The free end of the spring 241 is curved so that after the screw plunger has been inserted in the rack 96, and the rack 96 is turned, the outer end of the spring 241 will come into engagement with the upper end of the screw plunger and force it into the inner end of the recess 232. The spring 241 is made in such a form that after it has forced the screw plunger back into the recess 232, the screw plunger may pass under the spring in the further revolution of the rack 96.

When the screw plunger has been unscrewed from the insulator in the mold in the manner already described, and has been transferred to the rack, the mold table is moved by mechanism hereinafter described until the mold with its contained insulator is brought to the position marked C in Fig. 2. Before the mold reaches the position marked C it is automatically opened. The mechanism for opening the mold is particularly shown in Figs. 2, 5, 17, 18, 27, 28–33. As clearly shown in Figs. 28 to 33 the mold consists of three parts, the bottom plate 245, which is recessed on its upper side so as to form the top or head of the insulator, and the two jaws 246 and 247, which are pivoted together at their rear ends by the pivot bolt 248. The bottom plate 245 fits into and is held in place by a ring 249 which is bolted or otherwise suitably fastened to the mold table 4. The plate 245 has an upwardly projecting portion at its middle part which is recessed to form the head of the insulator, and the jaws of the mold are suitably recessed as shown, to receive this upwardly projecting portion of the bottom plate and to close around the same. 245ᵃ are air holes in the bottom plate to permit the passage of air for cooling purposes. Each of the jaws of the mold has a lug 250 projecting from its side, and a rod 251 passes through an opening in this lug. The rods 251 are pivoted at their inner ends to the crossbar 252, see Fig. 27. 253 is a collar fastened near the outer end of the rod 251 and adapted to strike against the lug 250 so as to open the mold at the proper time. 254 is a coiled spring encircling the rod 251 and bearing at one end against the lug 250, and at the other end against a collar 255 secured to the rod 251. 256 is a catch which is pivoted at 257 to one of the jaws of the mold. 258 is a rod which is pivoted at its outer end to the catch 256 and which is pivoted at its inner end to one end of the crossbar 252, as shown at 259 in Fig. 27. The rod 258 is made in two parts which are connected by an ordinary turn buckle 260 so that the length of the rod 258 can be accurately adjusted. The crossbar 252 has an extension 261 extending inwardly from its middle portion and carrying at its inner end the cam roller 262 which moves in a cam groove 263 in the lower face of a sleeve 264 which is bolted or otherwise suitably fastened to the post 6. The extension arms 261 move in and out over the surface of an annular casting 265 which is bolted to the mold table so as to revolve with the table, and the extensions 261 move in and out between the upper surface of this casting 265 and the lower face of the sleeve 264. The shape of the cam groove 263 is shown in Fig. 27. It is concentric with the post 6 except at a point opposite where the mold is to be opened, and at this point it curves inwardly toward the post 6. As the table approaches the position marked C in Figs. 2 and 27, the cam roller 262 is forced inwardly by the cam groove, and the extension 261 and the crossbar 252 are thus drawn inwardly toward the post 6, thereby moving the rods 251 and the rod 258 inwardly. As the rod 258 moves inwardly it swings the catch 256 on its pivot until the mold is unlocked. Thereafter the collars 253 on the rods 251 strike the lugs 250 and move the jaws 246 and 247 on their pivot, and so open the mold. The mold is now in a position in which the insulator can be removed. After the insulator has been removed by mechanism to be hereinafter described, the cam roller 262 is forced outwardly again by the cam groove 263, and the rods 251 and 258 are thus forced outwardly. As the rods 251 move outwardly the jaws 246 and 247 are moved toward each other by the action of the coiled springs 254 which are under compression and which tend to keep the lugs 250 pressed against the collars 253 until the mold has been closed. The rods 251 continue to move outwardly after the mold is closed, the springs 254 being compressed by this action. The rod 258 in its further outward motion swings the catch 256 on its pivot so as to lock the mold in its closed position. In this locked position the collars 253 have moved away a short distance from the lugs 250, as shown in Fig. 32, this being necessary to enable the catch 256 to be swung upon its pivot sufficiently to unlock the mold before the collars 253 strike the lugs 250 on the next inward motion of the rods 251.

The insulator-removing mechanism for removing the insulator from the mold and depositing it on a suitable carrier, is particularly shown in Figs. 1, 3, and 34–39. Referring to Figs. 34 to 38, 266 is an arm which is fastened at its inner end to the cross-head 20 so as to move up and down on the same, and which is forked at its outer end, as shown, to provide two bearings 267 for the rod 268. 269 is a collar attached to the upper end of the rod 268 and adapted to rest upon the upper bearing 267 so as to cause the rod 268 to rise with the arm 266. 270 are parallel guide-pieces supported from the arm 266 and forming a guideway between them into which projects the arm 271 which is fastened at its other end to the collar 269. The purpose of this arrangement is to prevent the rod 268 from turning in bearings 267. 272 is a spring which is coiled around the rod 268, the upper end of it pressing against the upper bearing 267 and the lower end of it pressing upon the collar 273, which is fastened to the rod 268. This spring tends to press the rod 268 downwardly in the bearings 267, but permits the rod 268 to have a slight vertical motion in those bearings. The rod 268, near its lower end, moves up and down in the bearing piece 274, which is supported by the bracket 275, which is fastened at its inner end to the rod 16, see Fig. 34. The rod 268 is provided at its lower end with an insulator holder 276 which is adapted to be forced down upon the insulator, after the mold has been opened, and to engage the same and lift it out of the mold. This holder is provided with a cylindrical recess of such a size as to receive the end of the insulator, as shown in Fig. 38. 277, 277 are pins which are adapted to move up and down in bearings in the holder 276, as shown. At their lower ends these pins bear against the grippers 278. These grippers are pivoted to the lugs 279, which project from the lower ends of the holder 276. The lower end of the gripper is shaped as shown in Fig. 36, and is adapted, when forced inwardly, to project into the groove in the head of the insulator, as shown in Fig. 38. The upper end of the gripper is provided with two bearing surfaces, as shown in Fig. 36, placed at the proper angle to each other, against one or the other of which the lower end of the spring plate 280 bears. The object of the spring plate is to hold the gripper in position after it has been moved on its pivot either so as to grip the insulator or to release it. The lower end of the gripper is provided with a projection 281 which is designed to strike the top of the mold when the holder 276 is forced downwardly over the top of the insulator, and thus to cause the grippers to be swung on their pivots so as to swing their lower ends inwardly to grip the insulator. 282 is an annular plate which is provided with a central opening to receive the upper end of the holder 276 and which is supported from the bracket 275 in any suitable manner, for example by the bolts 283 which are surrounded by the spacers 284. The purpose of the plate 282 is to strike the upper end of the pins 277 when the holder 276 is raised, and to force those pins downwardly in the holder, and thus to force the ends of the grippers out of the groove of the insulator and release the insulator at the proper time. 285 is a cross-head which is bolted or otherwise suitably fastened to the rod 268. 286, 286 are two levers which are pivotally connected to the opposite ends of the crosshead 285. 287 is a cup of such a shape as to receive the insulator, and pivoted in the lower ends of the levers 286 so as to swing freely between those levers. The levers 286 are pivoted at an intermediate point by the cross rod 288. The ends of this rod 288 project beyond the levers, and are fastened to the outer ends of links 289 so as to move with said links. These links at their inner ends are pivoted to a cross-bar 290, which is connected with the upper end of the bearing piece 274. The cross rod 288 is extended at one end so as to carry the sprocket wheel 291. 292 is a sprocket chain connecting the wheel 291 with the smaller sprocket wheel 293, which is fastened to an extension of one of the pivots of the cup 287.

When in the revolution of the mold table the mold has been brought to the position marked C in Fig. 2, and the mold has been opened in the manner already explained, the crosshead 20 descends and carries down with it the rod 268. The grippers 278 of the holder 276 are at this time in the position represented in Fig. 36. The holder is forced down over the end of the insulator, as represented in Fig. 38. When the projections 281 on the grippers strike the upper surface of the bottom plate 245 of the mold, the lower ends of the grippers are forced inwardly against the pressure of the spring plate 280, and are forced into the groove in the head of the insulator as represented in Fig. 38. In this movement the upper end of the gripper has been forced into such position that the spring plate 280 is now bearing upon the other surface at the upper end of the gripper, as represented in Fig. 38, and is thus operating to hold the gripper in engagement with the insulator. When the parts are in this position, as represented in Fig. 38, the cup 287 is in an inverted position, as represented in Fig. 38, and its connected parts are in the position shown in said figure. The rod 268 is then raised, and the insulator is lifted out of the mold. As the rod 268 rises, it carries up with it the crosshead 285, and so lifts the upper ends of the levers 268, turning these levers on the rod 288. At the same time the upper or outer ends of the links 289 are moved inwardly toward the rod 268. This throws the lower ends of the levers 286 underneath the holder 276, the parts at this time being in the position represented in Fig. 35. The cup 287 is thus brought underneath the insulator holder. As the upper ends of the links 289 move toward the rod 268, the cross rod 288 also turns, thereby revolving the sprocket wheel 291, and thereby turning the smaller sprocket wheel 293 in such a manner as to swing the cup 287 into the position represented in Fig. 35. After the cup 287 has been brought underneath the insulator in this manner, the pins 277 strike the under surface of the plate 282, and are forced downwardly in the holder 276, and thus force the ends of the grippers out of the groove in the insulator into the position represented in Fig. 35, as a result of which the insulator drops into the cup 287. When the rod 268 is again forced downwardly for a further operation, the lower ends of the levers 286 are forced outwardly into the position shown in Fig. 38, and the cup 287 is at the same time inverted in position, as a result of which the insulator drops out of the cup and is deposited on any suitable carrier or other device for conveying it to the leer. The carrier is not shown in the drawings, and forms no part of the present invention. Any device may be used for catching the insulator when it drops from the cup 287, but the machine is designed to deposit the insulator upon a suitable carrier which will convey the insulator to the leer.

When the insulator has been removed from the mold, the mold table is again moved, as a result of which the mold is first closed in the manner already described, and is then brought to the position marked D in Fig. 2. Here the mold is supplied with another charge of glass preparatory to molding another insulator. The mechanism for feeding the glass to the mold is particularly shown in Figs. 1, 2, 3 and 34. 294 is a drum which is adapted to revolve in bearings in a casting 295 which is supported from the bracket 28. The drum is provided with recesses 296 which are adapted to receive from a furnace, or any suitable source of supply, a charge of glass. The size of these recesses is regulated according to the size of the insulator to be made. 297 is the knife which is arranged in connection with the drum 294 so as to cut off or remove any surplus of glass that may project above the recess 296 in the drum. 298 is a pulley fastened to the shaft of the drum 294. 299 is a metal strap which is fastened at one end to the spring 300, see Fig. 1, which is connected with the bracket 28. The strap passes over the pulley 298, and is pivotally connected at its other end with the rock arm 301, see Fig. 2. The arm 301 is fastened to one end of the rock shaft 302, which is mounted to turn in suitable bearings supported from the bracket 28. 303 is a rock arm connected with the other end of the shaft 202. The free end of the arm 303 is connected with the sliding bar 304. This bar 304 slides backward and forward in suitable bearings which are fastened to the upper side of the brackets 46. The bar 304 is connected with an eccentric strap 305, within which revolves an eccentric 306 which is fastened to the shaft 43 and turns therewith. The eccentric and eccentric strap are made of such a form and so arranged that, at the proper time, the bar 304 is moved from right to left as represented in Fig. 2, thus moving the arm 303 and rocking shaft 302, and moving the arm 301 so as to draw the strap 299 from right to left, as presented in Fig. 2, thereby turning the pulley 298 and the drum 294 so as to empty a charge of glass from one of the recesses 296 into the trough 307. When the bar 304 is moved in the opposite direction, the strap 299 is slackened, and the spring 300 operates to draw it back across the surface of the pulley 298, but there is not sufficient friction between the two to cause the pulley to revolve with the strap in its backward motion. In the next forward throw of the strap the pulley 298 and the drum 294 are again turned. 308 is a handle by means of which the rock shaft 302 can be turned by hand for any purpose. 309 is a steam pipe leading to the interior of the drum 294, this drum being hollow. 310 is a return steam pipe leading from the other end of the drum. The drum is kept cool by the circulation of steam in this manner.

The charge of glass is delivered from the trough 307 into the chute 311, which is provided with a cross-arm 312 at its upper end having a bearing so that it may turn upon a pin 313 projecting outwardly from the crosspiece 27. The chute 311 is thus pivotally suspended at its upper end so that it may be placed at any angle relatively to the mold and to the trough 307. The chute 311 is adjusted by means of the rod 314, which is provided with a hand wheel 315 at its outer end, see Fig. 2, and which is adapted to turn in any suitable bearing at its inner end in the crosspiece 27. The rod 314 is connected with the cross arm 312 by means of the arm 316, which is fastened at one end to the rod 314, and is pivoted at its other end to the arms 317, the arms 317 being fastened at their other ends to the cross arms 312. Where the arms 316 and 317 are pivoted the joint is made loose so that these arms may slide upon each other to some extent. By turning the rod 314 in one direction the chute 311 will be dropped into a position more nearly vertical. By turning the rod 314 in the other direction the lower end of the chute will be moved outwardly toward the edge of the table. The lower end of the chute may be moved far enough in this direction so as to throw the glass beyond the mold if for any reason it was not desired to feed a new charge of glass into the mold. For example this might be done when the machine was being started and got into working order. 318 is a hollow guidepiece adapted to guide the glass from the lower end of the chute into the mold. The guidepiece 318 is supported from the arm 319 which is fastened in any suitable way to the arm 15.

In the operation of the machine molten glass is fed from the furnace in any suitable way to the drum 294, and this drum is revolved by the mechanism already described in such manner, and in such timing with reference to the rest of the machine, that when a mold is brought into the position marked D in Fig. 2, a charge of glass is delivered from the drum into the mold by means of the parts just described.

The mechanism for driving the mold table is shown in Figs. 1, 7 and 24. I have already explained how the disk 215 is driven from the motor. The disk 215 is connected by means of the pivoted rod 319, with the slide 320, which is adapted to slide or reciprocate back and forth on the surface of the ratchet 321 which is connected with the mold table 4 so as to turn therewith. The ratchet is provided with notches 322 which are adapted to engage the end of a pawl 323 which is pivoted to the slide 320, see Fig. 7. 324 is a spring bearing against the pawl and tending to press the end of the pawl into the notches 322. 325 is a plate, see Fig. 5, which is screwed or otherwise fastened to the under side of the plate 8. 326 is an arm which is pivoted at one end to the plate 325, and which is connected at the other end to a spring 327. The other end of the spring is connected to the plate 325, see Fig. 7. The arm 326 is provided with a dog 328 which is adapted to project into the notches 322 of the ratchet, and acts as a stop to hold the table in position during the periods of time when the molds are stationary and are being acted upon in the various ways already described. 328$^a$ is a projection on the disk 215 which at the proper time strikes the end of the arm 326 and forces the dog 328 out of the notch 322. The ratchet 321 is provided with a circular groove 329 on its upper surface into which pins project from the slide 320. When the slide is moved it is thus caused to move around on the periphery of the ratchet. As the disk 215 revolves it first forces the slide around the periphery of the ratchet 321 until the tooth of the pawl engages with one of the notches 322. As the disk continues to revolve the slide 320 is drawn in the other direction, and thus turns the ratchet and the table 4 one-ninth of a revolution, in the particular form of device shown in the drawings, thus advancing the molds from one position to the next adjoining position. When the table has been moved forward in this manner, it is locked in that position by reason of the fact that the lug 328 on the arm 326 catches in one of the notches 322. The throw of the slide 320 is so regulated and adjusted that at each revolution of the disk 215, the table 4 will be moved exactly the right distance to advance the molds from one position to the next position, and the parts are so arranged that the table will be locked by the lug 328 in such a position as to bring one mold immediately under the actuating rod, and another mold immediately under the rotary spindle, and another mold immediately under the rod 268, and another mold immediately under the hollow guidepiece 318. 330 is a roller, see Fig. 1, which is carried by the support 214 and upon which the mold table rides. This roller helps to support the table immediately under the actuating rod by which the screw plunger is inserted.

Referring to Figs. 3, 5, 6 and 7, 331 is a rock shaft provided at its upper end with two arms 332 which carry at their outer ends the bearing piece 333 against which the dog 334 is adapted to strike in the upward movement of the crosshead 20. The dog 334 is pivoted in any suitable manner to one side of the crosshead 20, see Fig. 3, so that when the crosshead 20 moves downward, and the under side of the dog 334 strikes the upper end of the bearing piece 333, the dog 334 will simply move on its pivot and thus slip past the bearing piece 333 without rocking the shaft 331. When the crosshead 20 rises, however, the upper surface of the dog 334 strikes the lower end of the bearing piece 333, and forces the bearing piece away from the crosshead 20, and so rocks the shaft 331. The shaft 331 is adapted to turn in bearings in the arms 17 and 18 supported from the standard 13. 335 is an arm which is securely fastened to the rock shaft 331 near its lower end. 336 is a link pivoted at one end to the arm 335, and at the other end to one end of the bell crank lever 337. This bell crank lever is pivoted at 338 to an arm 339 which is fastened in any suitable manner to the casting 10. The other end of the bell crank lever is provided with a pin projecting down into a groove in the sleeve 340 which is fastened to the rod 341. This rod slides in bearings in a bracket 342 which is supported in any suitable manner from the base 1 of the machine. This rod carries at its inner end a dog 343 which is constructed exactly like the dog 68 shown in Fig. 40 and already described. This dog operates in connection with the clutch 146 precisely as the dog 68 operates in connection with the clutch shown in Figs. 40 to 44. The rod 341 is surrounded with the coiled spring 344 which, at one end, bears against the bracket 342, and at the other end bears against a collar 345 fastened to the rod 341. The spring 344 tends to press the rod 341 toward the shaft 143, and thereby tends to disengage the clutch 146 so as to unlock the worm wheel 145 from the shaft 143. If for any reason during the operation of the machine the cross head 20 should not be lifted, the spring 344 would operate the clutch 146 and disengage the worm wheel 145 from the shaft 143. This would prevent the table from turning, and would also stop the revolution of the rotary spindle. This would cause the other parts of the machine to stop in case the crosshead 20 was prevented from rising for any reason. If the crosshead 20 rises, however, the dog 334 rocks the shaft 331 in the manner already explained, and so retracts the rod 341 and leaves the shaft 143 locked to the worm wheel 145, as a result of which the mold table will be revolved and also the rotary spindle. I have also provided additional means for operating the clutch 146 through the rod 341. This consists of a bell crank lever 346, see Fig. 5, the upper arm of which encircles the rod 341, and is provided with two pins 347 projecting outward toward the sleeve 340 and adapted to bear against the inner end of the same. The bell-crank lever is pivoted to a bracket 348 projecting upwardly from the base of the machine, and the lower arm of the bell-crank lever is connected by a link 349 with the lever 350 which is pivoted at one end to the arm 351 projecting down from the base of the machine and is provided at its outer end with the pedal 352, see Fig. 3. 353 is a spring attached at its lower end to the lever 350 and at its upper end to the base of the machine, and tending to hold that end of the lever in its highest position, and thus allowing the rod 341 to be forced toward the shaft 143 so as to disengage the worm 145 from that shaft. If for any reason it is desired to clutch the shaft 143 and the worm 145 together, independently of the operation of the rock shaft 331, this can be done by pressing the pedal 352, which will throw the rod 341 away from the shaft 143 and thus leave the shaft 143 and the worm wheel 145 clutched together.

The general operation of the machine is as follows: When the mold is in the position marked D in Fig. 2, a charge of glass is fed into the mold in the manner already described by the revolution of the drum 294. The mold table is then revolved in the direction of the arrow shown in Fig. 2, by the revolution of the disk 215, as already explained, until the mold is brought immediately under the actuating rod 26. In the meantime a screw plunger has been taken from the rack 96 by the cup 95 and its connected mechanism, and inserted in the lower end of the actuating rod in the manner already described, so that when the mold comes under the actuating rod the latter is provided with a screw plunger at its lower end ready for insertion in the mold. The actuating rod then descends in the manner already described, and forces a screw plunger into the mold, at the same time pressing the follower 34 downward upon the top of the mold. The actuating rod then rises, withdrawing the former 30 from the mold and afterward the follower, and leaving the screw plunger therein. The table is then revolved and the mold is carried around by a step and step motion until it is brought under the rotary spindle 123. Meanwhile the glass in the mold has been cooling until, by the time the mold is brought under the rotary spindle, the glass has set sufficiently to make it proper to remove the screw plunger. At this time the rotary spindle descends in the manner already described, and engages with the screw plunger, and as the rotary spindle revolves the screw plunger is unscrewed from the mold. As the rotary spindle rises the cup 195 is brought under the rotary spindle in the manner already described, and when the rotary spindle reaches its highest position the screw plunger is disengaged therefrom, and the cup 195 then carries the screw plunger from the unscrewing mechanism and inserts it in the rack 96 as already set forth. Meanwhile the table is again revolved until the mold reaches the position C shown in Fig. 2. Before it reaches this position the mold is opened in the manner already described, and the insulator is in position to be removed therefrom. The insulator is then lifted out of the mold by the rod 268 and the holder 276 as already described, and the insulator is then released from the holder and dropped into the cup 287 which thereafter deposits it on a carrier, or any other suitable device, by means of which it may be conveyed to the leer. The table is turned again until the mold is brought into its initial position, after which the operations are repeated. It will be observed that the four operations of feeding glass into one mold, of inserting a screw plunger in another mold, of unscrewing a screw plunger from the third mold, and of removing an insulator from a fourth mold, are all carried on simultaneously, and the screw-plunger transferring mechanism is so operated that after the actuating rod has inserted one screw plunger in one mold and left it there, and while it is moving upwardly, another screw plunger, which has been taken from the rack 96, is inserted in the lower end thereof so as to prepare it for another operation, and that after the rotary spindle has unscrewed a screw plunger from a mold, the same is disengaged from the rotary spindle and carried to and inserted in the rack, so that the rotary spindle is ready for another operation. The rack 96 is turned in such time, as to bring it into proper position to permit a screw plunger to be inserted in it on one side, and another screw plunger to be removed from it on the other.

It will be obvious that many of the parts of this machine may be changed both in construction and in operation, without departing from the principle of the invention, or sacrificing its main advantages. While I have shown in the drawings, and described in the specification the best embodiment of my invention, as I believe it to be, my invention is not limited to the details set forth, but these details may be greatly varied.

Many important advantages are secured by this invention. The manufacture of the insulators is entirely automatic. The glass is fed to the machine at one end from the furnace, and the finished insulator is delivered at another point in a condition ready for treatment in the leer. This secures great economy, both in time and labor. The work is done accurately and quickly. The parts of the machine may be so adjusted as to work in perfect time with one another. The number and size of the molds may be varied so as to fit any particular size of insulator, and the machine may be so adjusted, and run at such speed, as will allow the proper amount of time between operations for the cooling and setting of the glass. The parts are so arranged as to be readily adjustable so as to be made to operate in harmony with one another. The machine may be operated at such speed as to produce a very large output, and thus greatly reduce the cost of manufacture.

What I claim as new and desire to secure by Letters Patent, is:

1. In a molding press the combination of a mold, a mold table, a series of plungers, an actuating rod to insert the plungers in the mold, a rack to carry the plungers having recesses in its sides to receive the screw plungers, mechanism for revolving the rack, and mechanism for transferring the plungers from the rack to the actuating rod.

2. In a molding press, the combination of a mold, a mold table, a series of plungers, an actuating rod to insert the plungers in the mold, mechanism to remove the plunger from the mold, a rack to carry the plungers, mechanism for revolving the rack, mechanism for carrying the plungers from the removing mechanism to the rack, and mechanism for transferring the plungers from the rack to the actuating rod.

3. In a molding press, the combination of a mold, a rotary mold table adapted to carry the mold from the actuating rod to the plunger removing mechanism, means to revolve the table, a series of plungers, an actuating rod to insert the plungers in the mold, mechanism to remove the plunger from the mold, a rack to carry the plungers, mechanism for revolving the rack, mechanism for carrying the plungers from the removing mechanism to the rack, and mechanism for transferring the plungers from the rack to the actuating rod.

4. In a molding press, the combination of a mold, a mold table, a series of separable plungers, an actuating rod to insert the plungers in the mold, mechanism for supplying the plungers to the rod, mechanism for removing the plungers from the mold, mechanism for opening the mold, and mechanism for removing the article from the mold.

5. In a molding press, the combination of a mold, a rotary mold table adapted to carry the mold from the actuating rod to the plunger removing mechanism, means to revolve the table, a series of plungers, an actuating rod to insert the plungers in the mold, mechanism to remove the plunger from the mold, a rack to carry the plungers, mechanism for revolving the rack, mechanism for carrying the plungers from the removing mechanism to the rack, mechanism for transferring the plungers from the rack to the actuating rod, mechanism for opening the mold, and mechanism for removing the article from the mold.

6. In a molding press, the combination of a mold, a rotary mold table adapted to carry the mold from the actuating rod to the plunger removing mechanism, means to revolve the table, a series of plungers, an actuating rod to insert the plungers in the mold, mechanism to remove the plunger from the mold, a rack to carry the plungers, mechanism for revolving the rack, mechanism for carrying the plungers from the removing mechanism to the rack, mechanism for transferring the plungers from the rack to the actuating rod, mechanism for opening the mold, mechanism for removing the article from the mold, and mechanism for feeding the material to the mold.

7. In a molding press, the combination of a series of molds, a rotary mold table adapted to carry the mold from the actuating rod to the plunger removing mechanism, means to revolve the table, a series of screw plungers, an actuating rod to insert the plungers in the molds, mechanism to unscrew the plungers from the molds, a rack to carry the plungers, mechanism for revolving the rack, mechanism for carrying the plungers from the unscrewing mechanism to the rack, and mechanism for transferring the plungers from the rack to the actuating rod.

8. In a molding press, the combination of a series of molds, a rotary mold table adapted to carry the mold from the actuating rod to the plunger removing mechanism, means to revolve the table, a series of screw plungers, an actuating rod to insert the plungers in the molds, mechanism to unscrew the plungers from the molds, a rack to carry the plungers, mechanism for revolving the rack, mechanism for carrying the plungers from the unscrewing mechanism to the rack, mechanism for transferring the plungers from the rack to the actuating rod, and mechanism for lowering the actuating rod and causing it to insert a screw-plunger in a mold, and for simultaneously lowering the unscrewing mechanism and causing it to unscrew a screw plunger from another mold when the table is at rest.

9. In a molding press, the combination of a series of molds, a rotary mold table adapted to carry the mold from the actuating rod to the plunger-removing mechanism, means to revolve the table, a series of screw plungers, an actuating rod to insert the plungers in the molds, mechanism to unscrew the plungers from the molds, a rack to carry the plungers, mechanism for revolving the rack, mechanism for carrying the plungers from the unscrewing mechanism to the rack, mechanism for transferring the plungers from the rack to the actuating rod, and mechanism for lowering the actuating rod and causing it to insert a screw plunger in a mold, and for simultaneously lowering the unscrewing mechanism and causing it to unscrew a screw plunger from another mold when the table is at rest, and for moving the table so as to carry the molds from one position to another after the actuating rod and unscrewing mechanism have been raised.

10. In a molding press, the combination of a mold, a rotary mold table adapted to carry the mold from the actuating rod to the plunger removing mechanism, means to revolve the table, a series of plungers, an actuating rod to insert the plungers in the mold, mechanism to remove the plunger from the mold, a rack to carry the plungers, mechanism for revolving the rack, a cup for carrying the plungers from the removing mechanism to the rack, an arm supporting said cup, mechanism for swinging said arm from the removing mechanism to the rack and back again, a cup for transferring the plungers from the rack to the actuating rod, an arm supporting said cup, and mechanism for swinging said arm from the rack to the actuating rod and back again.

11. In a molding press, the combination of a mold, a rotary mold table adapted to carry the mold from the actuating rod to the plunger removing mechanism, means to revolve the table, a series of plungers, an actuating rod to insert the plungers in the mold, mechanism to remove the plunger from the mold, a rack to carry the plungers, mechanism for revolving the rack, a cup for carrying the plungers from the removing mechanism to the rack, an arm supporting said cup, mechanism for swinging said arm from the removing mechanism to the rack and back again, a cup for transferring the plungers from the rack to the actuating rod, an arm supporting said cup, and mechanism for swinging said arm toward the rack so as to cause the cup to engage a plunger therein, and then swinging said arm back so as to bring the cup under the actuating rod, and then lifting the cup so as to engage the plunger with the actuating rod, and then swinging the arm and cup back from said rod and plunger.

12. In a molding press, the combination of a mold, a mold table, a series of plungers, an actuating rod to insert the plungers in the mold, a cross-head to which the actuating rod is fastened, an eccentric device for operating the crosshead, and means for driving the eccentric device.

13. In a molding press, the combination of a mold, a mold table, a series of plungers, an actuating rod to insert the plungers in the mold, a hollow former attached to the actuating rod and adapted to engage the screw plungers, a follower supported from the actuating rod and adapted to slide on the former and pivoted rods adapted to hold the follower down, and means for moving the free ends of said rods into and out of engagement with the follower, and means for operating the actuating rod.

14. In a molding press, the combination of a mold, a mold table, a series of plungers, an actuating rod to insert the plungers in the mold, a hollow former attached to the actuating rod and adapted to engage the screw plungers, a follower supported from the actuating rod and adapted to slide on the former and pivoted rods adapted to hold the follower down, springs for pressing said rods inwardly and projections on the said rods and on the actuating rod adapted to move said rods outwardly when the actuating rod rises so as to release the follower, and means for operating the actuating rod.

15. In a molding press, the combination of a mold, a mold table, a series of plungers, an actuating rod to insert the plungers in the mold, a cross-head to which the actuating rod is fastened, provided with an opening, a wheel having a bearing device eccentrically mounted thereon projecting into said opening, and means for driving the wheel, whereby the crosshead and rod are lifted by the wheel and descend by their own weight.

16. In a molding press, the combination of a series of molds, a rotary mold table, a series of plungers, an actuating rod to insert the plungers in the molds, a crosshead to which the actuating rod is fastened, a wheel for operating the crosshead, operative means between the wheel and the crosshead and mechanism for driving the wheel and table so constructed that a mold will be brought under the rod, the rod will then descend so as to insert a plunger in the mold, the rod will then rise, and the table will then be revolved to remove the mold from under the rod.

17. In a molding press, the combination of a series of molds, a rotary mold table, a series of plungers, an actuating rod to insert the plungers in the molds, a crosshead to which the actuating rod is fastened, a wheel for operating the crosshead, operative means between the wheel and the crosshead, a rack to carry the plungers, and mechanism for transferring the plungers from the rack and attaching them to the actuating rod, and mechanism for driving the wheel and table so constructed that a mold will be brought under the rod, the rod will then descend so as to insert a plunger in the mold, the rod will then rise, and the table will then be revolved to remove the mold from under the rod.

18. In a molding press, the combination of a series of molds, a rotary mold table, a series of plungers, an actuating rod to insert the plungers in the molds, means for operating the actuating rod, a rotating rack to carry the plungers, a cup for transferring the plungers from the rack to the actuating rod, an arm supporting said cup, a rock shaft carrying said arm, and means for rocking the rock shaft as the rod rises so as to bring the cup under the actuating rod and means for lifting and lowering said rock-shaft in order to attach the plunger to the rod, and means for rocking the rock shaft so as to swing the cup from the actuating rod to the rack.

19. In a molding press, the combination of a series of molds, a rotary mold table, a series of plungers, an actuating rod to insert the plungers in the molds, means for operating the actuating rod, a rotating rack to carry the plungers having recesses in its side to receive the screw plungers, a cup for transferring the plungers from the rack to the actuating rod, an arm supporting said cup, and mechanism for swinging said arm from the rack to the actuating rod and back again.

20. In a molding press, the combination of a series of molds, a rotary mold table, a series of plungers, an actuating rod to insert the plungers in the molds, means for operating the actuating rod, a rotating rack to carry the plungers, a cup for transferring the plungers from the rack to the actuating rod, an arm supporting said cup, mechanism for swinging said arm from the rack to the actuating rod and back again, and mechanism for lifting and lowering the arm in order to attach the plunger to the rod.

21. In a molding press, the combination of a series of molds, a rotary mold table, a series of plungers, an actuating rod to insert the plungers in the molds, means for operating the actuating rod, a rotating rack to carry the plungers, a cup for transferring the plungers from the rack to the actuating rod, an arm supporting said cup, a rock shaft carrying said arm, and means for rocking the rock shaft as the rod rises so as to bring the cup under the actuating rod and means for lifting and lowering said rock shaft in order to attach the plunger to the rod, and a cam plate connected with the actuating rod, and an arm connected with the rock shaft and adapted to be moved by the cam plate so as to rock the rock shaft and swing the cup to the rack.

22. In a molding press, the combination of a series of molds, a rotary mold table, a series of plungers, an actuating rod to insert the plungers in the molds, means for operating the actuating rod, a rotating rack to carry the plungers, a cup for transferring the plungers from the rack to the actuating rod, an arm supporting said cup, a rock shaft carrying said arm, a cam plate connected with the actuating rod, an arm connected with the rock shaft and adapted to be moved by the cam plate so as to rock the rock shaft and swing the cup to the rack, and a spring to rock the rock shaft in the opposite direction, and means for lifting and lowering said rock shaft in order to attach the plunger to the rod.

23. In a molding press, the combination of a series of molds, a rotary mold table, a series of plungers, an actuating rod to insert the plungers in the molds, means for operating the actuating rod, a rotating rack to carry the plungers, a cup for transferring the plungers from the rack to the actuating rod, an arm supporting said cup, a rock shaft carrying said arm, a cam plate connected with the actuating rod, an arm connected with the rock shaft and adapted to be moved by the cam plate so as to rock the rock shaft and swing the cup to the rack, and a spring to rock the rock shaft in the opposite direction, and a stop to hold the rock shaft in a middle position, and means to move said stop out of the way, and means for lifting and lowering said rock shaft in order to attach the plunger to the rod.

24. In a molding press, the combination of a series of molds, a rotary mold table, a series of plungers, an actuating rod to insert the plungers in the molds, a crosshead to which the actuating rod is fastened, a wheel for operating the crosshead, operative means between the wheel and the crossheads, a rotating rack to carry the plungers, a cup for transferring the plungers from the rack to the actuating rod, an arm supporting said cup, a rock shaft carrying said arm, a cam plate connected with the actuating rod, an arm connected with the rock shaft and adapted to be moved by the cam plate so as to rock the rock shaft and swing the cup to the rack, and a spring to rock the rock shaft in the opposite direction, a stop to hold the rock shaft in a middle position, a cam piece connected with the wheel, a movable pin against which the cam piece strikes during the upward motion of the actuating rod, and connections between the pin and the stop whereby the stop will be moved out of the way when the cam piece strikes the pin, and means for lifting and lowering the rock shaft in order to attach the plunger to the rod.

25. In a molding press, the combination of a series of molds, a rotary mold table, a series of plungers, an actuating rod to insert the plungers in the molds, means for operating the actuating rod, a rotating rack to carry the plungers, a cup for transferring the plungers from the rack to the actuating rod, an arm supporting said cup, a rock shaft carrying said arm, a cam plate connected with the actuating rod, an arm connected with the rock shaft and adapted to be moved by the cam plate so as to rock the rock shaft and swing the cup to the rack, and a spring to rock the rock shaft in the opposite direction, means for lifting the rock shaft in order to attach the plunger to the rod, and adapted to release the rock shaft and let it fall by gravity, and means to rock the rock shaft as it descends so as to move the cup from underneath the actuating rod.

26. In a molding press, the combination of a series of molds, a rotary mold table, a series of plungers, an actuating rod to insert the plungers in the molds, means for operating the actuating rod, a rotating rack to carry the plungers, a cup for transferring the plungers from the rack to the actuating rod, an arm supporting said cup, a rock shaft carrying said arm, a cam plate connected with the actuating rod, an arm connected with the rock shaft and adapted to be moved by the cam plate so as to rock the rock shaft and swing the cup to the rack, and a spring to rock the rock shaft in the opposite direction, means for lifting the rock shaft in order to attach the plunger to the rod, and adapted to release the rock shaft and let it fall by gravity, a pin connected with the rock shaft, a movable guide piece in the path of said pin and adapted to rock the rock shaft as it descends so as to move the cup from underneath the actuating rod.

27. In a molding press, the combination of a series of molds, a rotary mold table, a series of plungers, an actuating rod to insert the plungers in the molds, a crosshead to which the actuating rod is fastened, a wheel for operating the crosshead, operative means between the wheel and the crosshead, a rotating rack to carry the plungers, a cup for transferring the plungers from the rack to the actuating rod, an arm supporting said cup, a rock shaft carrying said arm, a projecting piece on the wheel, a dog on the rock shaft with which the projecting piece engages so as to lift the rock shaft, and then release it, a pin connected with the rock shaft, a movable guide piece in the path of said pin and adapted to rock the rock shaft as it descends so as to move the cup from underneath the actuating rod, means for further rocking the rock shaft so as to swing the cup to the rack, and a spring to rock the rock shaft toward the actuating rod.

28. In a molding press, the combination of a series of molds, a rotary mold table, a series of plungers, an actuating rod to insert the plungers in the mold, a crosshead to which the actuating rod is fastened, provided with an opening, a wheel for operating the crosshead having a cam roller projecting into the opening of the crosshead, a rotating rack to carry the plungers, a cup for transferring the plungers from the rack to the actuating rod, an arm supporting said cup, a rock shaft carrying said arm, a projecting piece on the wheel, a dog on the rock shaft with which the projecting piece engages so as to lift the rock shaft and then release it, the projecting piece being farther from the center of the wheel than the cam roller, a pin connected with the rock shaft, a movable guide piece in the path of said pin adapted to rock the rock shaft as it descends so as to move the cup from underneath the actuating rod, means for further rocking the rock shaft so as to swing the cup to the rack, and a spring to rock the rock shaft toward the actuating rod.

29. In a molding press, the combination of a series of molds, a rotary mold table, a series of plungers, the actuating rod 26, the crosshead 20, the wheel 23, the rotating rack 96, the cup 95, the arm 94 for supporting said cup, the rock shaft 87, the projecting piece 107 on the wheel, the dog 106 on the rock shaft, the pin 101 connected with the rock shaft, the pivoted guide piece 120, the cam plate 83 connected with the crosshead and provided with cam groove 84, and the arm 89 connected with the rock shaft and adapted to be operated by the cam plate 83, and the spring 91.

30. In a molding press, the combination of a mold, a rotary mold table, a series of plungers, means for inserting the plungers in the mold, a threaded rotary spindle for withdrawing the plunger, mechanism for rotating the spindle, a threaded device adapted to engage the spindle, mechanism for forcing the threaded device into engagement with the thread on the spindle after the spindle has engaged the plunger whereby the spindle will be raised, mechanism for disengaging the threaded device from the spindle after the spindle has been raised sufficiently, and mechanism for holding the spindle in its raised position until another plunger is ready for removal.

31. In a molding press, the combination of a series of molds, a rotary mold table, a series of screw plungers, means for inserting the plungers in the molds, a threaded rotary spindle for unscrewing the plungers, mechanism for rotating the spindle, a threaded device adapted to engage the spindle, mechanism for forcing the threaded device into engagement with the thread of the spindle, said mechanism being thrown into operation by the descent of the spindle itself, an arm connected with the threaded device, and a projection on the spindle adapted to move said arm and disengage the threaded device from the spindle after the spindle has been raised sufficiently, and mechanism for holding the spindle in its raised position until another plunger is to be removed.

32. In a molding press, the combination of a series of molds, a rotary mold table, a series of screw plungers, means for inserting the plungers in the molds, a threaded rotary spindle for unscrewing the plungers, mechanism for rotating the spindle, a half nut adapted to engage the spindle, a lever for moving the half nut, a spring tending to move the lever so as to cause the half nut to engage the spindle, a stop to hold the lever against the pressure of the spring, a projection on the spindle operating to move said stop out of the path of the lever on the descent of the spindle, an arm connected with the half nut, and a projection on the spindle adapted to move said arm and disengage the half nut from the spindle after the spindle has been raised sufficiently, and mechanism for holding the spindle in its raised position until another plunger is to be removed.

33. In a molding press, the combination of a series of molds, a rotary mold table, a series of screw plungers, means for inserting the plungers in the molds, a threaded rotary spindle for unscrewing the plungers, mechanism for rotating the spindle, a threaded device adapted to engage the spindle, mechanism for forcing the threaded device into engagement with the thread of the spindle, said mechanism being thrown into operation by the descent of the spindle itself, an arm connected with the threaded device, and a projection on the spindle adapted to move said arm and disengage the threaded device from the spindle after the spindle has been raised sufficiently, and an arm for holding the spindle in its raised position, and mechanism for throwing said arm out of engagement with the spindle when another mold is brought under the spindle.

34. In a molding press, the combination of a series of molds, a rotary mold table, a series of screw plungers, means for inserting the plungers in the molds, a threaded rotary spindle for unscrewing the plungers, mechanism for rotating the spindle, a half nut adapted to engage the spindle, a lever for moving the half nut, a spring tending to move the lever so as to cause the half nut to engage the spindle, a stop to hold the lever against the pressure of the spring, a rock shaft for operating the stop, an arm connected with the rock shaft adapted to be moved by a projection on the spindle when the spindle descends, and thus to turn the rock shaft, a second arm connected with the rock shaft adapted to operate the stop, an arm connected with the half nut, a projection on the spindle adapted to move said arm and disengage the half nut from the spindle after the spindle has been raised sufficiently, an arm for holding the spindle in its raised position, a rock shaft to which said arm is fastened, a spring for turning the rock shaft so as to press the arm against the spindle, a second arm connected with said rock shaft, and a pin on the mold for moving said second arm and thus rocking the rock shaft.

35. In a molding press, the combination of a mold, a series of plungers, means for inserting the plungers in the mold, a rotary spindle for withdrawing the plunger, mechanism for rotating the spindle, a socket at the lower end of the spindle adapted to receive the screw plunger, means connected with said socket to hold the screw plunger therein, a plug adapted to move in a recess in the lower end of the spindle, and adapted to bear against the upper end of the plunger, and means for forcing said plug downwardly when the spindle rises so as to force the plunger out of engagement with the spindle.

36. In a molding press, the combination of a series of molds, a rotary mold table, a series of plungers, means for inserting the plungers in the molds, a rotary spindle for removing the plungers, a rack to carry the plungers, mechanism for revolving the rack, a cup for carrying the plungers from the spindle to the rack, an arm supporting said cup, and mechanism for swinging the arm from the spindle to the rack and back again.

37. In a molding press, the combination of a series of molds, a rotary mold table, a series of plungers, means for inserting the plungers in the molds, a rotary spindle for removing the plungers, a rack to carry the plungers, mechanism for revolving the rack, a cup for carrying the plungers from the spindle to the rack, an arm supporting said cup, mechanism for swinging the arm from the spindle to the rack, a spring for swinging the arm from the rack to the spindle, a stop to hold the arm in a middle position, and means to move said stop out of the way when the spindle rises.

38. In a molding press, the combination of a series of molds, a rotary mold table, a series of plungers, means for inserting the plungers in the molds, a rotary spindle for removing the plungers, a rack to carry the plungers, mechanism for revolving the rack, a cup for carrying the plungers from the spindle to the rack, an arm supporting said cup, a rock shaft to which said arm is attached, means for rocking said rock shaft so as to swing the arm from the spindle to the rack, a spring for swinging the arm from the rack to the spindle, an arm connected with the rock shaft, a stop in the path of said arm, adapted to hold the rock shaft in a middle position, and means for moving said stop out of the way of the arm when the spindle rises so as to cause the rock shaft to turn and thereby bring the cup underneath the spindle.

39. In a molding press, the combination of a series of molds, a rotary mold table, a series of plungers, means for inserting the plungers in the molds, a rotary spindle for removing the plungers, a rack to carry the plungers, mechanism for revolving the rack, the cup 195, the arm 202, the rock shaft 198, the arm 226 connected with the rock shaft, the dog 231, the stop lever 224 adapted to hold the arm 226 in a middle position, means for moving the lever 224 out of the path of the arm 226 when the spindle rises, means for swinging the rock shaft so as to swing the cup 195 from the spindle to the rack, and the spring 209 for swinging the rock shaft in the opposite direction.

40. In a molding press, the combination of a series of molds, a rotary mold table, a series of plungers, means for inserting the plungers in the molds, a rotary spindle for removing the plungers, a rack to carry the plungers, mechanism for revolving the rack, a cup for carrying the plungers from the spindle to the rack, an arm supporting said cup, a rock shaft to which said arm is attached, means for rocking said rock shaft so as to swing the arm from the spindle to the rack, a spring for swinging the arm from the rack to the spindle, an arm connected with the rock shaft, a stop in the path of said arm, adapted to hold the rock shaft in a middle position, and means for moving said stop out of the way of the arm when the spindle rises so as to cause the rock shaft to turn and thereby bring the cup underneath the spindle, a ratchet device connected with the rack, and a pawl device connected with the rock shaft whereby the rack is turned as the rock shaft is rocked in one direction.

41. In a molding press, the combination of a series of molds, a rotary mold table, a series of plungers, means for inserting the plungers in the molds, a rotary spindle for removing the plungers, a rack to carry the plungers, mechanism for revolving the rack, the cup 195, the arm 202, the rock shaft 198, the disk 215 connected with the driving shaft, the rock shaft 206, means for connecting the disk with the rock shaft 206 so as to rock that shaft in one direction, the spring 209 for rocking the shaft 206 in the opposite direction, means for connecting the rock shaft 206 and the rock shaft 198.

42. In a molding press, the combination of a series of molds, a rotary mold table, a series of plungers, means for inserting the plungers in the molds, a rotary spindle for removing the plungers, a rack to carry the plungers, mechanism for revolving the rack, the cup 195, the arm 202, the rock shaft 198, means for rocking the rock shaft so as to swing the cup from the spindle to the rack, a spring for rocking the rock shaft in the reverse direction, the arm 226 connected with the rock shaft, the pivoted lever 224 operating as a stop to hold the arm 226 in a middle position, the spring 225, the rock shaft 221, the arm 223 connected with said rock shaft and adapted to bear against the lever 224, and means connected with the spindle for turning the rock shaft 221 as the spindle rises so as to move the lever 224 out of the path of the arm 226 and thereby cause the cup 195 to be swung under the spindle.

43. In a molding press, the combination of a series of molds, a rotary mold table, a series of screw plungers, means for inserting the plungers in the molds, a threaded rotary spindle for unscrewing the plungers, mechanism for rotating the spindle, a threaded device adapted to engage the spindle, mechanism for forcing the threaded device into engagement with the thread of the spindle, said mechanism being thrown into operation by the descent of the spindle itself, an arm connected with the threaded device, a projection on the spindle adapted to move said arm and disengage the threaded device from the spindle after the spindle has been raised sufficiently, mechanism for holding the spindle in its raised position until another plunger is to be removed, a rack to carry the plungers, mechanism for revolving the rack, a cup for carrying the plungers from the spindle to the rack, an arm supporting said cup, mechanism for swinging the cup under the spindle after the spindle has been raised so as to receive the screw plunger, and mechanism for swinging the cup from the spindle to the rack.

44. In a molding press, the combination of a series of molds, a rotary mold table, a series of screw plungers, means for inserting the plungers in the molds, a threaded rotary spindle for unscrewing the plungers, mechanism for rotating the spindle, a half nut adapted to engage the spindle, mechanism for forcing the half nut into engagement with the thread of the spindle, said mechanism being thrown into operation by the descent of the spindle itself, an arm connected with the half nut, a projection on the spindle adapted to move said arm and disengage the half nut from the spindle after the spindle has been raised sufficiently, an arm for holding the spindle in its raised position, and mechanism for throwing said arm out of engagement with the spindle when another mold is brought under the spindle, a socket at the lower end of the spindle adapted to receive the screw plunger, means for engaging the screw plunger in the said socket, means for forcing the screw plunger out of said socket when the spindle is raised, a rack to carry the plungers, mechanism for revolving the rack, a cup for carrying the plungers from the spindle to the rack, an arm for supporting said cup, mechanism for swinging the arm underneath the spindle before the screw plunger is forced out from the socket so that the cup receives said screw plunger, mechanism for then swinging the arm and cup from the spindle to the rack, and mechanism for swinging the cup and arm back from the rack underneath the spindle after the spindle has been lowered and raised again.

45. In a molding press, the combination of a mold having movable jaws, a rotary mold table carrying the mold, means for forming the article in the mold, rods connected with the jaws of the mold, a catch pivoted to the mold and adapted to lock the jaws together, a rod connected with said catch, and a stationary cam for operating all of said rods.

46. In a molding press, the combination of a mold having pivoted jaws, a mold table, rods connected with the jaws of the mold by a spring connection, a catch pivoted to one of the jaws and adapted to lock the jaws together, a rod connected with said catch, and a cam for operating all of said rods, whereby the jaws are first closed and then locked by the catch and the catch is swung on its pivot to unlock the jaws, before the rods move said jaws.

47. In a molding press, the combination of a mold having pivoted jaws, a mold table, rods connected with the jaws of the mold by a spring connection, a cross-bar connected to said rods, a catch pivoted to one of the jaws and adapted to lock the jaws together, a rod connected with said catch, and also connected to the cross-bar, and a cam for operating the cross-bar whereby the jaws are first closed and then locked by the catch, and the catch is swung on the pivot to unlock the jaws before the rods move the said jaws.

48. In a molding press, the combination of a mold having pivoted jaws 246, 247, provided with the lugs 250, a mold table, the rods 251 provided with the collars 253 and 255, the springs 254, a catch pivoted to one of the jaws and adapted to lock the jaws together, a rod connected with the said catch, a cross-bar with which all of said rods are connected, and a cam for operating the cross-bar.

49. In a molding press, the combination of a mold, a mold table, means for forming the article in the mold, an upright rod for removing the insulator from the mold, means for raising and lowering said rod, an insulator holder carried by the lower end of said rod, means in the holder to engage the insulator when the rod is lowered, and means for releasing the insulator when the rod is raised.

50. In a molding press, the combination of a mold, a mold table, means for forming the article in the mold, a rod for removing the insulator from the mold, means for raising and lowering said rod, an insulator holder carried by said rod, grippers pivoted in said holder and adapted to engage the insulator when the rod is lowered, springs to hold said grippers in position, and means to disengage the grippers from the insulator when the rod is raised.

51. In a molding press, the combination of a mold, a mold table, means for forming the article in the mold, a rod for removing the insulator from the mold, means for raising and lowering said rod, an insulator holder carried by said rod, grippers pivoted in said holder and adapted to engage the insulator when the rod is lowered, springs to hold said grippers in position, and pins movable in the holder and bearing on said grippers, and means for forcing the pins down so as to disengage the grippers when the rod is raised.

52. In a molding press, the combination of a mold, a mold table, means for forming the article in the mold, the rod 268, means for raising and lowering said rod, the insulator holder 276 fastened to said rod, the grippers 278 pivoted to said holder, the springs 280, the pins 277 and the plate 282 adapted to force the pins downwardly when the rod is raised and thus to release the insulator.

53. In a molding press, the combination of a mold, a mold table, means for forming the article in the mold, an upright rod for removing the insulator from the mold, means for raising and lowering said rod, an insulator holder carried by the lower end of said rod, means in the holder to engage the insulator when the rod is lowered, and means for releasing the insulator when the rod is raised, a cup to catch the insulator when it is released from the holder, and means for moving the cup under said holder when the rod is raised and for then moving it from underneath said holder.

54. In a molding press, the combination of a mold, a mold table, means for forming the article in the mold, an upright rod for removing the insulator from the mold, means for raising and lowering said rod, an insulator holder carried by the lower end of said rod, means in the holder to engage the insulator when the rod is lowered, and means for releasing the insulator when the rod is raised, a swinging cup to catch the insulator when it is released from the holder, means for moving the cup under said holder when the rod is raised, and at the same time swinging said cup into position to receive the insulator, and means for moving said cup back from underneath said holder, and at the same time swinging said cup so as to discharge the insulator therefrom.

55. In a molding press, the combination of a mold, a mold table, means for forming the article in the mold, an upright rod for removing the insulator from the mold, means for raising and lowering the lower end of said rod, an insulator holder carried by said rod, means in the holder to engage the insulator when the rod is lowered, means for releasing the insulator when the rod is raised, the cup 287, the levers 286 to which the cup is pivotally connected, the levers being fastened at one end to the said rod, the links 289, the cross-rod 288, the sprocket wheel 291, the sprocket chain 292 and the sprocket wheel 293.

56. In a molding press, the combination of a mold, a mold table, means for forming the article in the mold, a rod for removing the insulator from the mold, means for raising and lowering said rod, an insulator holder carried by said rod, grippers pivoted in said holder and adapted to engage the insulator when the rod is lowered, springs to hold said grippers in position, and means to disengage the grippers from the insulator when the rod is raised, the cup 287, the levers 286, to which the cup is pivoted, one end of the levers being fastened to the said rod, the links 289, the cross-rod 288, the sprocket wheel 291, the sprocket wheel 293, and the sprocket chain 292.

57. In a molding press, the combination of a mold, a mold table, a series of plungers, an actuating rod to insert the plungers in the mold, a crosshead to which the actuating rod is fastened, means for operating the crosshead, an arm connected with said crosshead, a rod for removing the insulator from the mold connected with said arm, an insulator holder carried by the said rod, means in the holder to engage the insulator when the rod is lowered, and means for releasing the insulator when the rod is raised.

58. In a molding press, the combination of a mold, a mold table, a series of plungers, an actuating rod to insert the plungers in the mold, a crosshead to which the actuating rod is fastened, means for operating the crosshead, an arm connected with said crosshead, a rod for removing the insulator from the mold connected with said arm, an insulator holder carried by said rod, means in the holder to engage the insulator when the rod is lowered, and means for releasing the insulator when the rod is raised, a cup to catch the insulator when it is released from the holder, and means for moving the cup under said holder when the rod is raised, and for then removing it from underneath said holder.

59. In a molding press, the combination of a mold, a mold table, a series of plungers, an actuating rod to insert the plungers in the mold, a crosshead to which the actuating rod is fastened, means for operating the crosshead, an arm connected with said crosshead, a rod for removing the insulator from the mold connected with said arm, an insulator holder carried by the said rod, means in the holder to engage the insulator when the rod is lowered, and means for releasing the insulator when the rod is raised, a swinging cup to catch the insulator when it is released from the holder, means for moving the cup under said holder when the rod is raised, and for swinging it at the same time so as to adapt it to receive the insulator, and means for then moving the cup from underneath said holder and for swinging it at the same time into a position to discharge the insulator.

60. In a molding press, the combination of a mold, a mold table, and means for feeding glass to the mold consisting of a drum provided with recesses of proper size, a knife to remove the surplus of glass from the drum, a pulley connected with the drum, a strap adapted to press upon the pulley, and means for drawing the strap over the surface of the pulley so as to revolve the drum.

61. In a molding press, the combination of a mold, a mold table, and means for feeding glass to the mold consisting of a drum provided with recesses of proper size, a knife to remove the surplus of glass from the drum, a pulley connected with the drum, a strap adapted to press upon the pulley, a shaft by which said feeding mechanism is operated, an eccentric on said shaft, and means connecting the eccentric with the strap.

In testimony whereof, I have signed my name to this specification, in the presence of two subscribing witnesses.

SIGWARD OLSEN.

Witnesses:
 EDWIN SEGER,
 JOHN O. GEMPLER.